United States Patent
He et al.

(10) Patent No.: US 9,743,098 B2
(45) Date of Patent: Aug. 22, 2017

(54) MULTI-LEVEL SIGNIFICANCE MAP SCANNING

(75) Inventors: Dake He, Waterloo (CA); Nguyen Nguyen, Waterloo (CA); Tianying Ji, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 889 days.

(21) Appl. No.: 13/446,186

(22) Filed: Apr. 13, 2012

(65) Prior Publication Data
US 2013/0128985 A1 May 23, 2013

Related U.S. Application Data

(60) Provisional application No. 61/561,872, filed on Nov. 19, 2011.

(51) Int. Cl.
| H04N 7/30 | (2006.01) |
| H04N 19/40 | (2014.01) |
| H04N 19/176 | (2014.01) |
| H04N 19/70 | (2014.01) |
| H04N 19/46 | (2014.01) |

(Continued)

(52) U.S. Cl.
CPC .......... *H04N 19/40* (2014.11); *H04N 19/129* (2014.11); *H04N 19/13* (2014.11); *H04N 19/136* (2014.11); *H04N 19/176* (2014.11); *H04N 19/18* (2014.11); *H04N 19/46* (2014.11); *H04N 19/61* (2014.11);

(Continued)

(58) Field of Classification Search
None
See application file for complete search history.

(56) References Cited

U.S. PATENT DOCUMENTS

2007/0041450 A1* 2/2007 Kim et al. ............... 375/240.24
2007/0071331 A1 3/2007 Liu
(Continued)

FOREIGN PATENT DOCUMENTS

| EP | 2154894 A1 | 2/2010 |
| WO | 2008108534 A1 | 9/2008 |
| WO | 2011128303 A2 | 10/2011 |

OTHER PUBLICATIONS

Pennebaker et al., "The JPEG Still Picture Compression Standard," Jan. 1, 1992.*

(Continued)

*Primary Examiner* — Joseph Ustaris
*Assistant Examiner* — Edemio Navas, Jr.
(74) *Attorney, Agent, or Firm* — Rowand LLP

(57) ABSTRACT

Methods of encoding and decoding for video data are described in which multi-level significance maps are used in the encoding and decoding processes. The significant-coefficient flags that form the significance map are grouped into contiguous groups, and a significant-coefficient-group flag signifies for each group whether that group contains no non-zero significant-coefficient flags. A multi-level scan order may be used in which significant-coefficient flags are scanned group-by-group. The group scan order specifies the order in which the groups are processed, and the scan order specifies the order in which individual significant-coefficient flags within the group are processed. The bitstream may interleave the significant-coefficient-group flags and their corresponding significant-coefficient flags, if any.

29 Claims, 17 Drawing Sheets

(51) Int. Cl.
  H04N 19/13     (2014.01)
  H04N 19/63     (2014.01)
  H04N 19/129    (2014.01)
  H04N 19/61     (2014.01)
  H04N 19/136    (2014.01)
  H04N 19/18     (2014.01)
  H04N 19/91     (2014.01)
(52) U.S. Cl.
  CPC ............ *H04N 19/63* (2014.11); *H04N 19/70* (2014.11); *H04N 19/91* (2014.11)

(56) References Cited

U.S. PATENT DOCUMENTS

| | | | |
|---|---|---|---|
| 2007/0110153 A1* | 5/2007 | Cho et al. | 375/240.12 |
| 2008/0219578 A1* | 9/2008 | Lee | 382/247 |
| 2011/0096834 A1* | 4/2011 | Cheon et al. | 375/240.12 |
| 2011/0200110 A1 | 8/2011 | Chen et al. | |
| 2011/0249721 A1* | 10/2011 | Karczewicz et al. | 375/240.02 |
| 2012/0082233 A1* | 4/2012 | Sze et al. | 375/240.18 |
| 2013/0016771 A1* | 1/2013 | Misra | H04N 19/176 375/240.03 |

OTHER PUBLICATIONS

EPO Partial Search Report relating to application No. 11187410.3 dated Feb. 15, 2012.

Nguyen, Nguyen et al., "Multi-Level Significance Maps for Large Transform Units", Joint Collaborative Team on Video Coding (JCT-VC) of ITU-T SG16 WP3 and ISO/IEC JTC1/SC29/WG11, No. JCTVC-G644, Nov. 9, 2011.

Marpe, H. Schwarz, and T. Wiegand, "Context-based adaptive binary arithmetic coding in the h.264/AVC video compression standard," IEEE Transactions on Circuits and Systems for Video Technology, 13(7):620-636, Jul. 2003.

B. Bross, W-J Han, J-R Ohm, G. J. Sullivan, and T. Wiegand, "WD4: Working Draft 4 of High-Efficiency Video Coding," JCT-VC of ITU-T SG16 WP3 and ISO/IEC JTC1/SC29/WG11, 6th Meeting, Torino, Jul. 2011.

F. Bossen, "Common test conditions and software reference configurations", JCTVC-F900, JCT-VC of ITU-T SG16 WP3 and ISO/IEC JTC1/SC29/WG11, 6th Meeting, Torino, Jul. 2011.

T. Nguyen, T. Winken, D. Marpe et al., "Reduced-complexity entropy coding of transform coefficient levels using a combination of VLC and PIPE", JCTVC-D336, JCT-VC of ITU-T SG16 WP3 and ISO/IEC JTC1/SC29/WG11, 4th Meeting, Daegu, Jan. 2011.

USPTO, US Office Action relating to U.S. Appl. No. 13/286,336 dated May 9, 2014.

EPO, Extended European Search Report relating to application No. 12164134.4 dated Feb. 15, 2013.

Nguyen, N. et al; "Multi-level Significant Maps for Large Transform Units", 7. JCT-VC Meeting; 98. MPEG Meeting; Nov. 21, 2011-Nov. 30, 2011; Geneva; (Joint Collaborative Team on Video Coding of ISO/EIC JTC1/SC29/WG11 and ITU-T SG. 16); URL:http://wftp3.itu.int/au-arch/jctvc.site/ No. JCTVC-G644, Nov. 9, 2011, XP030110628.

Bross, B. et al; WD4: Working Draft 4 of High-Efficiency Video Coding, 6 JCT-VC Meeting; 97 MPEG Meeting; Jul. 14, 2011-Jul. 22, 2011; Torino; (Joint Collaborative Team on Video Coding of ISO/IEC JTC1/SC29/WG11 and ITU-T SG. 16); URL: http://wftp3.itu.int/av-arch/jctvc-site/ No. JCTVC-F803, Sep. 8, 2011, XP030009800.

\* cited by examiner xC

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 5 | 2 | 0 | 1 | 1 | 0 | 0 | 0 | 1 | 1 | 1 | 0 | 0 | 0 | 0 | 0 |
| 1 | 5 | 0 | 2 | 1 | 2 | 0 | 1 | 1 | 0 | 2 | 1 | 0 | 1 | 0 | 0 | 0 |
| 2 | 0 | 1 | 0 | 0 | 1 | 0 | 1 | 1 | 0 | 1 | 1 | 1 | 0 | 0 | 0 | 0 |
| 3 | 0 | 0 | 0 | 1 | 1 | 1 | 1 | 1 | 0 | 0 | 1 | 0 | 0 | 0 | 0 | 0 |
| 4 | 1 | 1 | 0 | 0 | 1 | 0 | 1 | 0 | 0 | 1 | 0 | 1 | 0 | 0 | 0 | 0 |
| 5 | 2 | 1 | 0 | 1 | 0 | 0 | 1 | 0 | 1 | 0 | 0 | 1 | 0 | 0 | 0 | 0 |
| 6 | 0 | 0 | 1 | 0 | 0 | 0 | 1 | 0 | 1 | 0 | 0 | 0 | 0 | 0 | 0 | 0 |
| 7 | 1 | 0 | 0 | 1 | 1 | 0 | 1 | 0 | 0 | 0 | 0 | 0 | 0 | 0 | 0 | 0 |
| 8 | 0 | 1 | 1 | 1 | 0 | 1 | 0 | 1 | 1 | 1 | 1 | 0 | 0 | 1 | 0 | 0 |
| 9 | 0 | 0 | 1 | 0 | 0 | 1 | 1 | 1 | 0 | 0 | 0 | 1 | 0 | 0 | 0 | 0 |
| 10 | 1 | 0 | 0 | 1 | 0 | 0 | 0 | 0 | 1 | 1 | 0 | 0 | 1 | 0 | 0 | 0 |
| 11 | 0 | 0 | 1 | 0 | 0 | 0 | 0 | 0 | 1 | 1 | 0 | 0 | 0 | 0 | 0 | 0 |
| 12 | 0 | 1 | 0 | 0 | 0 | 1 | 0 | 0 | 0 | 0 | 0 | 0 | 0 | 0 | 0 | 0 |
| 13 | 0 | 0 | 0 | 1 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | yC (row labels); 100; 112

FIG. 3

|   | xC |   |   |   |   |   |   |   |   |   |   |   |   |   |   |   |
|---|---|---|---|---|---|---|---|---|---|---|---|---|---|---|---|---|
|   | 0 | 1 | 2 | 3 | 4 | 5 | 6 | 7 | 8 | 9 | 10 | 11 | 12 | 13 | 14 | 15 |
| 0 | 1 | 1 | 0 | 1 | 1 | 0 | 0 | 0 | 1 | 1 | 1 | 0 | 0 | 0 | 0 | 0 |
| 1 | 1 | 0 | 1 | 1 | 1 | 0 | 1 | 1 | 0 | 1 | 1 | 0 | 0 | 0 | 0 | 0 |
| 2 | 0 | 1 | 0 | 0 | 1 | 0 | 1 | 1 | 0 | 1 | 1 | 1 | 0 | 0 | 0 | 0 |
| 3 | 0 | 0 | 0 | 1 | 1 | 1 | 1 | 1 | 0 | 0 | 1 | 0 | 0 | 0 | 0 | 0 |
| 4 | 1 | 1 | 0 | 0 | 1 | 0 | 1 | 0 | 0 | 1 | 0 | 1 | 0 | 0 | 0 | 0 |
| 5 | 1 | 1 | 0 | 1 | 0 | 0 | 1 | 0 | 1 | 0 | 0 | 1 | 0 | 0 | 0 | 0 |
| 6 | 0 | 0 | 1 | 0 | 0 | 0 | 1 | 0 | 1 | 0 | 0 | 0 | 0 | 0 | 0 | 0 |
| 7 | 1 | 0 | 0 | 1 | 1 | 0 | 1 | 0 | 0 | 0 | 0 | 0 | 0 | 0 | 0 | 0 |
| 8 | 0 | 1 | 1 | 1 | 0 | 1 | 0 | 1 | 1 | 1 | 1 | 0 | 0 | 1 | 0 | 0 |
| 9 | 0 | 0 | 1 | 0 | 0 | 1 | 1 | 1 | 0 | 0 | 0 | 1 | 0 | 0 | 0 | 0 |
| 10 | 1 | 0 | 0 | 1 | 0 | 0 | 0 | 0 | 1 | 1 | 0 | 0 | 1 | 0 | 0 | 0 |
| 11 | 0 | 0 | 1 | 0 | 0 | 0 | 0 | 0 | 1 | 1 | 0 | 0 | 0 | 0 | 0 | 0 |
| 12 | 0 | 0 | 0 | 0 | 0 | 0 | 0 | 0 | 0 | 0 | 0 | 0 | 0 | 0 | 0 | 0 |
| 13 | 0 | 0 | 0 | 0 | 0 | 0 | 0 | 0 | 0 | 0 | 0 | 0 | 0 | 0 | 0 | 0 |
| 14 | 0 | 0 | 0 | 0 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 | 0 | 0 | 0 | 0 | yC (row labels), 500

FIG. 10

MULTI-LEVEL SIGNIFICANCE MAP SCANNING

CROSS-REFERENCE TO RELATED APPLICATIONS

The present application claims priority to U.S. provisional patent application 61/561,872, filed Nov. 19, 2011, and owned in common herewith, the contents of which are hereby incorporated by reference.

COPYRIGHT NOTICE

A portion of the disclosure of this document and accompanying materials contains material to which a claim for copyright is made. The copyright owner has no objection to the facsimile reproduction by anyone of the patent document or the patent disclosure, as it appears in the Patent and Trademark Office files or records, but reserves all other copyright rights whatsoever.

FIELD

The present application generally relates to data compression and, in particular, to methods and devices for encoding and decoding video using multi-level significance maps.

BACKGROUND

Data compression occurs in a number of contexts. It is very commonly used in communications and computer networking to store, transmit, and reproduce information efficiently. It finds particular application in the encoding of images, audio and video. Video presents a significant challenge to data compression because of the large amount of data required for each video frame and the speed with which encoding and decoding often needs to occur. The current state-of-the-art for video encoding is the ITU-T H.264/AVC video coding standard. It defines a number of different profiles for different applications, including the Main profile, Baseline profile and others. A next-generation video encoding standard is currently under development through a joint initiative of MPEG-ITU: High Efficiency Video Coding (HEVC).

There are a number of standards for encoding/decoding images and videos, including H.264, that use block-based coding processes. In these processes, the image or frame is divided into blocks, typically 4x4 or 8x8, and the blocks are spectrally transformed into coefficients, quantized, and entropy encoded. In many cases, the data being transformed is not the actual pixel data, but is residual data following a prediction operation. Predictions can be intra-frame, i.e. block-to-block within the frame/image, or inter-frame, i.e. between frames (also called motion prediction). It is expected that HEVC (may also be called H.265) will also have these features.

When spectrally transforming residual data, many of these standards prescribe the use of a discrete cosine transform (DCT) or some variant thereon. The resulting DCT coefficients are then quantized using a quantizer to produce quantized transform domain coefficients, or indices.

The block or matrix of quantized transform domain coefficients (sometimes referred to as a "transform unit") is then entropy encoded using a particular context model. In H.264/AVC and in the current development work for HEVC, the quantized transform coefficients are encoded by (a) encoding a last significant coefficient position indicating the location of the last non-zero coefficient in the block, (b) encoding a significance map indicating the positions in the block (other than the last significant coefficient position) that contain non-zero coefficients, (c) encoding the magnitudes of the non-zero coefficients, and (d) encoding the signs of the non-zero coefficients. This encoding of the quantized transform coefficients often occupies 30-80% of the encoded data in the bitstream.

Transform units are typically NxN. Common sizes include 4x4, 8x8, 16x16, and 32x32, although other sizes are possible. The entropy encoding of the symbols in the significance map is based upon a context model. In the case of a 4x4 luma or chroma block or transform unit (TU), a separate context is associated with each coefficient position in the TU. That is, the encoder and decoder track a total of 30 (excluding the bottom right corner positions) separate contexts for 4x4 luma and chroma TUs. The 8x8 TUs are partitioned (conceptually for the purpose of context association) into 2x2 blocks such that one distinct context is associated with each 2x2 block in the 8x8 TU. Accordingly, the encoder and decoder track a total of 16+16=32 contexts for the 8x8 luma and chroma TUs. This means the encoder and decoder keep track of and look up 62 different contexts during the encoding and decoding of the significance map. When 16x16 TUs and 32x32 TUs are taken into account, the total number of distinct contexts involved is 88. Among the additional 26 contexts, 13 are for luma TUs and 13 are for chroma TUs. The assignment of the 13 contexts to the coefficient positions in a 16x16 or 32x32 TU is as follows. Let (r, c) denote a position in the TU, where $0<=r, c<=15$ if the TU is of size 16x16, and $0<=r, c<=31$ if the TU is of size 32x32. Then 3 distinct contexts are assigned to the three positions (0, 0), (0, 1), (1, 0) at the top-left corner including the DC position (0, 0); 5 distinct contexts are assigned to positions in the region $\{(r, c): 2<=r+c<5\}$; and the last 5 distinct contexts are assigned to all the remaining positions. Except for the first 3 contexts for (0, 0), (0, 10), and (1, 0), the derivation of the context for a position in the region $\{(r, c): 2<=r+c<5\}$ depends on its lower-right neighborhood. Let $s(r, c)$ denote the significance flag of a coefficient at position (r, c), i.e., $s(r, c)=1$ if the coefficient is not zero and $s(r, c)=1$ otherwise. The context for position (r, c) is equal to min(s(r+1, c)+s(r, c+1)+s(r+2,c)+s(r, c+2)+s(r+1,c+1), 4), where min(a, b) returns the smaller value between a and b. The context of a position (r, c) in the remaining region $\{(r, c): r+c>=5\}$ is similarly derived.

The contexts for 4x4 and 8x8 significance maps are determined by the bit position. The contexts for 16x16 and 32x32 significance maps are mostly determined by the values of the neighboring bits. The determination of context for the 16x16 and 32x32 significance maps is fairly computationally intense, because in most cases the processor determines context by looking at the values of neighboring significant flags, which involves costly memory access operations.

BRIEF DESCRIPTION OF THE DRAWINGS

Reference will now be made, by way of example, to the accompanying drawings which show example embodiments of the present application, and in which:

FIG. 3 shows an example transform unit containing quantized transform domain coefficients;

FIG. 10 shows the example L0 significance map of FIG. 4 after application of L1 RDOQ;

Similar reference numerals may have been used in different figures to denote similar components.

DESCRIPTION OF EXAMPLE EMBODIMENTS

Figure 1:
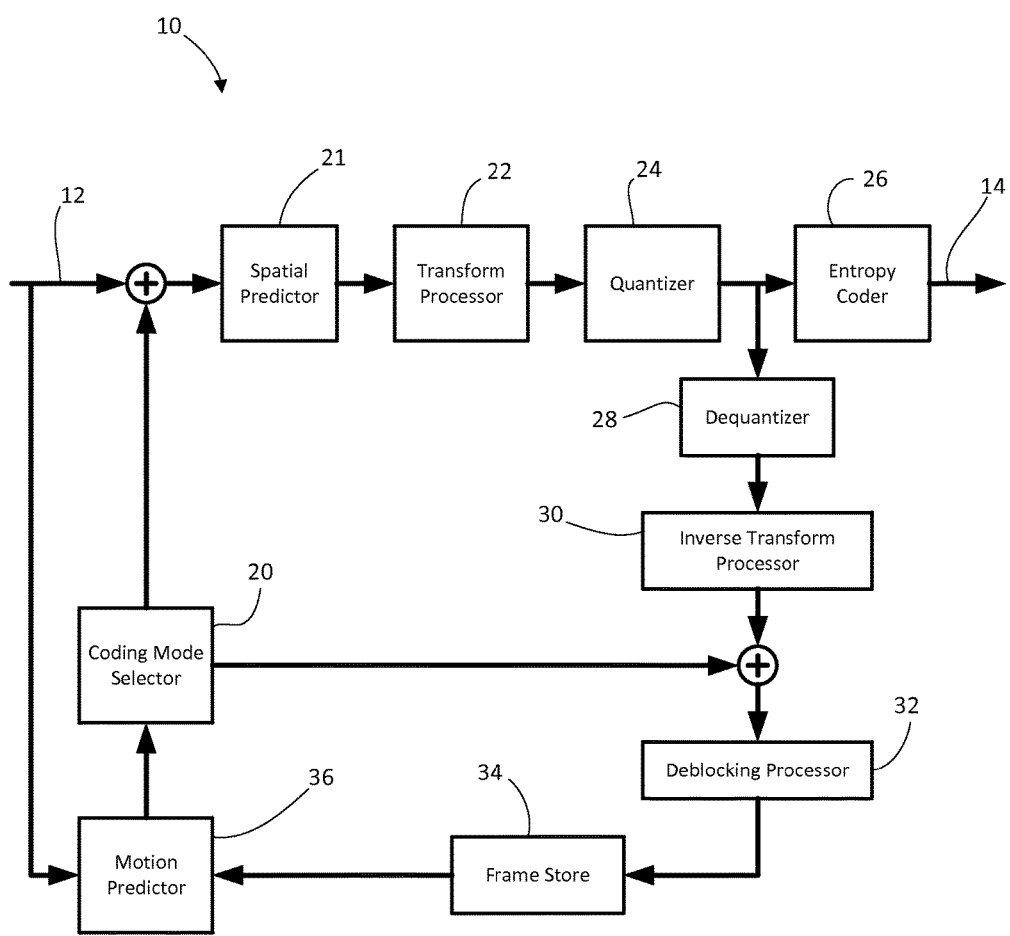
FIG. 1 shows, in block diagram form, an encoder for encoding video.

The present application describes methods and encoders/decoders for encoding and decoding significance maps with context-adaptive encoding or decoding. The encoder and decoder use multi-level significance maps. In at least one case, the multi-level maps are used with larger transform units, such as the 16×16 and 32×32 TUs.

In one aspect, the present application describes a method of reconstructing significant-coefficient flags for a transform unit from a bitstream of encoded data, the bitstream including encoded significant-coefficient-group flags, and wherein each significant-coefficient-group flag corresponds to a respective group of significant-coefficient flags. The method includes, for each of the respective groups of significant-coefficient flags in a group scan order, reconstructing that group's corresponding significant-coefficient-group flag, and reconstructing the significant-coefficient flags in that group by decoding the significant-coefficient flags from the bitstream in a scan order within the group, if the corresponding significant-coefficient-group flag is non-zero, and setting the significant-coefficient flags to zero, if the corresponding significant-coefficient-group flag is zero.

In another aspect, the present application describes a method for encoding significant-coefficient flags for a transform unit. The method includes, for each respective group of significant-coefficient flags in a group scan order, encoding that group's corresponding significant-coefficient-group flag, unless a special case applies, and wherein the significant-coefficient-group flag is set to zero to indicate that that corresponding group contains no non-zero significant-coefficient flags, and encoding the significant-coefficient flags in that group in a scan order within the group, if the corresponding significant-coefficient-group flag is non-zero.

In one aspect, the reconstruction of the significant-coefficient flags is performed in a prescribed order, such as a scan order. In another aspect, the reconstruction of the significant-coefficient-group flags is performed in a prescribed order, which may be the same prescribed order as used with the reconstruction of the significant-coefficient flags, such as the scan order.

In one aspect, a significant-coefficient-group flag is set to zero if all significant-coefficient flags in the corresponding group are zero. In another aspect, a significant-coefficient-group flag is non-zero if at least one significant-coefficient flag in the corresponding group is non-zero. In another aspect, a special case may result in a significant-coefficient-group flag being non-zero even if all significant-coefficient flags in the corresponding group are zero, in which case the decoder will decode all the zero value significant-coefficient flags for that corresponding group from the bitstream.

In a further aspect, the present application describes encoders and decoders configured to implement such methods of encoding and decoding.

In yet a further aspect, the present application describes non-transitory computer-readable media storing computer-executable program instructions which, when executed, configured a processor to perform the described methods of encoding and/or decoding.

Other aspects and features of the present application will be understood by those of ordinary skill in the art from a review of the following description of examples in conjunction with the accompanying figures.

In the description that follows, some example embodiments are described with reference to the H.264 standard for video coding and/or the developing HEVC standard. Those ordinarily skilled in the art will understand that the present application is not limited to H.264/AVC or HEVC but may be applicable to other video coding/decoding standards, including possible future standards, multi-view coding standards, scalable video coding standards, and reconfigurable video coding standards.

In the description that follows, when referring to video or images the terms frame, picture, slice, tile and rectangular slice group may be used somewhat interchangeably. Those of skill in the art will appreciate that, in the case of the H.264 standard, a frame may contain one or more slices. It will also be appreciated that certain encoding/decoding operations are performed on a frame-by-frame basis, some are performed on a slice-by-slice basis, some picture-by-picture, some tile-by-tile, and some by rectangular slice group, depending on the particular requirements or terminology of the applicable image or video coding standard. In any particular embodiment, the applicable image or video coding standard may determine whether the operations described below are performed in connection with frames and/or slices and/or pictures and/or tiles and/or rectangular slice groups, as the case may be. Accordingly, those ordinarily skilled in the art will understand, in light of the present disclosure, whether particular operations or processes described herein and particular references to frames, slices, pictures, tiles, rectangular slice groups are applicable to frames, slices, pictures, tiles, rectangular slice groups, or some or all of those for a given embodiment. This also applies to transform units, coding units, groups of coding units, etc., as will become apparent in light of the description below.

The present application describes example processes and devices for encoding and decoding significance maps. A significance map is a block, matrix or group of flags that maps to, or corresponds to, a transform unit or a defined unit of coefficients (e.g. several transform units, a portion of a transform unit, or a coding unit). Each flag indicates whether the corresponding position in the transform unit or the specified unit contains a non-zero coefficient or not. In existing standards, these flags may be referred to as significant-coefficient flags. In existing standards, there is one flag per coefficient and the flag is a bit that is zero if the corresponding coefficient is zero and is set to one if the corresponding coefficient is non-zero. The term "significance map" as used herein is intended to refer to a matrix or ordered set of significant-coefficient flags for a transform unit, as will be understood from the description below, or a defined unit of coefficients, which will be clear from the context of the applications.

Although the examples described herein relate to significance maps, the multi-level encoding and decoding processes may be applied to other syntax elements in video coding, e.g., coefficient levels, filter coefficients, and motion vectors (after binarization), which may exhibit group structures. For example, a local group of coefficient levels might be all one with high probability. Similarly, a local group of motion vectors might be all zero in one direction (zero horizontal movement for example), or a set of filter coefficients may be all zero in neighboring frequency bands.

It will also be understood, in light of the following description, that the multi-level encoding and decoding structure might be applied in certain situations, and those situations may be determined from side information like video content type (natural video or graphics as identified in sequence, picture, or slice headers). For example, two levels may be used for natural video, and three levels may be used for graphics (which is typically much more sparse). Yet another possibility is to provide a flag in one of the sequence, picture, or slice headers to indicate whether the structure has one, two, or three levels, thereby allowing the encoder the flexibility of choosing the most appropriate structure for the present content.

Figure 2:
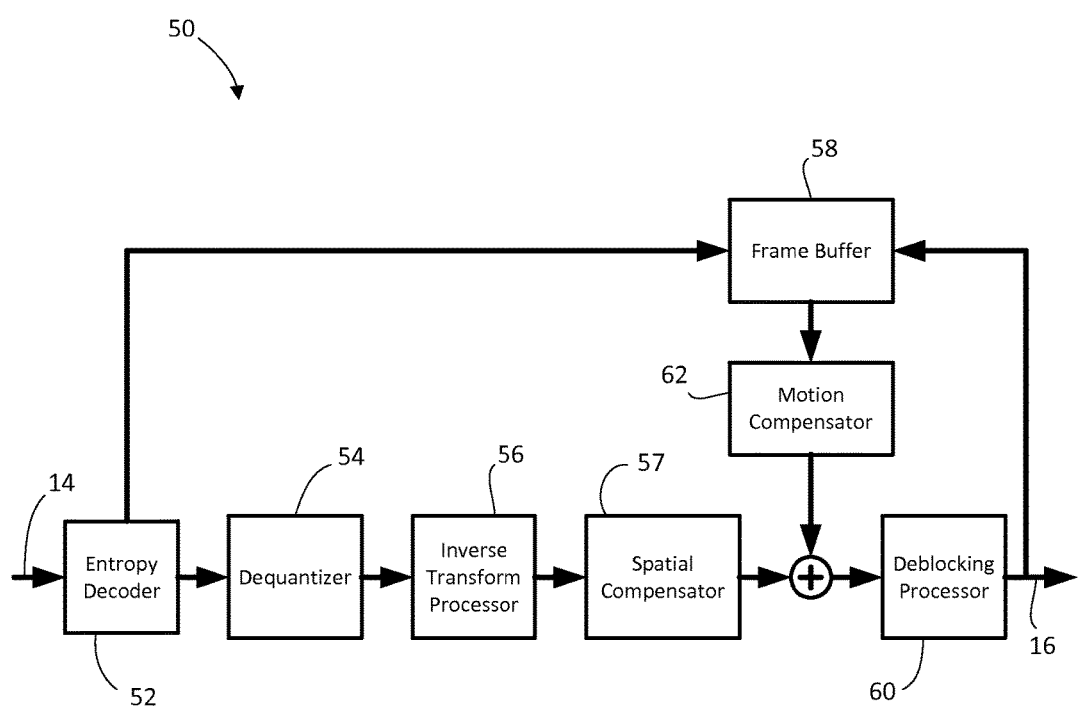
FIG. 2 shows, in block diagram form, a decoder for decoding video.

Reference is now made to FIG. 1, which shows, in block diagram form, an encoder 10 for encoding video. Reference is also made to FIG. 2, which shows a block diagram of a decoder 50 for decoding video. It will be appreciated that the encoder 10 and decoder 50 described herein may each be implemented on an application-specific or general purpose computing device, containing one or more processing elements and memory. The operations performed by the encoder 10 or decoder 50, as the case may be, may be implemented by way of application-specific integrated circuit, for example, or by way of stored program instructions executable by a general purpose processor. The device may include additional software, including, for example, an operating system for controlling basic device functions. The range of devices and platforms within which the encoder 10 or decoder 50 may be implemented will be appreciated by those ordinarily skilled in the art having regard to the following description.

The encoder 10 receives a video source 12 and produces an encoded bitstream 14. The decoder 50 receives the encoded bitstream 14 and outputs a decoded video frame 16. The encoder 10 and decoder 50 may be configured to operate in conformance with a number of video compression standards. For example, the encoder 10 and decoder 50 may be H.264/AVC compliant. In other embodiments, the encoder 10 and decoder 50 may conform to other video compression standards, including evolutions of the H.264/AVC standard, like HEVC.

The encoder 10 includes a spatial predictor 21, a coding mode selector 20, transform processor 22, quantizer 24, and entropy encoder 26. As will be appreciated by those ordinarily skilled in the art, the coding mode selector 20 determines the appropriate coding mode for the video source, for example whether the subject frame/slice is of I, P, or B type, and whether particular coding units (e.g. macroblocks, coding units, etc.) within the frame/slice are inter or intra coded. The transform processor 22 performs a transform upon the spatial domain data. In particular, the transform processor 22 applies a block-based transform to convert spatial domain data to spectral components. For example, in many embodiments a discrete cosine transform (DCT) is used. Other transforms, such as a discrete sine transform or others may be used in some instances. The block-based transform is performed on a coding unit, macroblock or sub-block basis, depending on the size of the macroblocks or coding units. In the H.264 standard, for example, a typical 16×16 macroblock contains sixteen 4×4 transform blocks and the DCT process is performed on the 4×4 blocks. In some cases, the transform blocks may be 8×8, meaning there are four transform blocks per macroblock. In yet other cases, the transform blocks may be other sizes. In some cases, a 16×16 macroblock may include a non-overlapping combination of 4×4 and 8×8 transform blocks.

Applying the block-based transform to a block of pixel data results in a set of transform domain coefficients. A "set" in this context is an ordered set in which the coefficients have coefficient positions. In some instances the set of transform domain coefficients may be considered as a "block" or matrix of coefficients. In the description herein the phrases a "set of transform domain coefficients" or a "block of transform domain coefficients" are used interchangeably and are meant to indicate an ordered set of transform domain coefficients.

The set of transform domain coefficients is quantized by the quantizer 24. The quantized coefficients and associated information are then encoded by the entropy encoder 26.

The block or matrix of quantized transform domain coefficients may be referred to herein as a "transform unit".

Intra-coded frames/slices (i.e. type I) are encoded without reference to other frames/slices. In other words, they do not employ temporal prediction. However intra-coded frames do rely upon spatial prediction within the frame/slice, as illustrated in FIG. 1 by the spatial predictor 21. That is, when encoding a particular block the data in the block may be compared to the data of nearby pixels within blocks already encoded for that frame/slice. Using a prediction algorithm, the source data of the block may be converted to residual data. The transform processor 22 then encodes the residual data. H.264, for example, prescribes nine spatial prediction modes for 4×4 transform blocks. In some embodiments, each of the nine modes may be used to independently process a block, and then rate-distortion optimization is used to select the best mode.

The H.264 standard also prescribes the use of motion prediction/compensation to take advantage of temporal prediction. Accordingly, the encoder 10 has a feedback loop that includes a de-quantizer 28, inverse transform processor 30, and deblocking processor 32. The deblocking processor 32 may include a deblocking processor and a filtering processor. These elements mirror the decoding process implemented by the decoder 50 to reproduce the frame/slice. A frame store 34 is used to store the reproduced frames. In this manner, the motion prediction is based on what will be the reconstructed frames at the decoder 50 and not on the original frames, which may differ from the reconstructed frames due to the lossy compression involved in encoding/decoding. A motion predictor 36 uses the frames/slices stored in the frame store 34 as source frames/slices for comparison to a current frame for the purpose of identifying similar blocks. Accordingly, for macroblocks or coding units to which motion prediction is applied, the "source data" which the transform processor 22 encodes is the residual data that comes out of the motion prediction process. For example, it may include information regarding the reference frame, a spatial displacement or "motion vector", and residual pixel data that represents the differences (if any) between the reference block and the current block. Information regarding the reference frame and/or motion vector may not be processed by the transform processor 22 and/or quantizer 24, but instead may be supplied to the entropy encoder 26 for encoding as part of the bitstream along with the quantized coefficients.

Those ordinarily skilled in the art will appreciate the details and possible variations for implementing video encoders.

The decoder 50 includes an entropy decoder 52, dequantizer 54, inverse transform processor 56, spatial compensator 57, and deblocking processor 60. The deblocking processor 60 may include deblocking and filtering processors. A frame buffer 58 supplies reconstructed frames for use by a motion compensator 62 in applying motion compensation. The spatial compensator 57 represents the operation of recovering the video data for a particular intra-coded block from a previously decoded block.

The bitstream 14 is received and decoded by the entropy decoder 52 to recover the quantized coefficients. Side information may also be recovered during the entropy decoding process, some of which may be supplied to the motion compensation loop for use in motion compensation, if applicable. For example, the entropy decoder 52 may recover motion vectors and/or reference frame information for inter-coded macroblocks.

The quantized coefficients are then dequantized by the dequantizer 54 to produce the transform domain coefficients, which are then subjected to an inverse transform by the inverse transform processor 56 to recreate the "video data". It will be appreciated that, in some cases, such as with an intra-coded macroblock or coding unit, the recreated "video data" is the residual data for use in spatial compensation relative to a previously decoded block within the frame. The spatial compensator 57 generates the video data from the residual data and pixel data from a previously decoded block. In other cases, such as inter-coded macroblocks or coding units, the recreated "video data" from the inverse transform processor 56 is the residual data for use in motion compensation relative to a reference block from a different frame. Both spatial and motion compensation may be referred to herein as "prediction operations".

The motion compensator 62 locates a reference block within the frame buffer 58 specified for a particular inter-coded macroblock or coding unit. It does so based on the reference frame information and motion vector specified for the inter-coded macroblock or coding unit. It then supplies the reference block pixel data for combination with the residual data to arrive at the reconstructed video data for that coding unit/macroblock.

A deblocking/filtering process may then be applied to a reconstructed frame/slice, as indicated by the deblocking processor 60. After deblocking/filtering, the frame/slice is output as the decoded video frame 16, for example for display on a display device. It will be understood that the video playback machine, such as a computer, set-top box, DVD or Blu-Ray player, and/or mobile handheld device, may buffer decoded frames in a memory prior to display on an output device.

It is expected that HEVC-compliant encoders and decoders will have many of these same or similar features.

Significance Map Encoding

As noted above, the entropy coding of a block or set of quantized transform domain coefficients includes encoding the significance map (e.g. a set of significant-coefficient-flags) for that block or set of quantized transform domain coefficients. The significance map is a binary mapping of the block indicating in which positions (other than the last position) non-zero coefficients appear. The block may have certain characteristics with which it is associated. For example, it may be from an intra-coded slice or an inter-coded slice. It may be a luma block or a chroma block. The QP value for the slice may vary from slice to slice. All these factors may have an impact on the best manner in which to entropy encode the significance map.

The significance map is converted to a vector in accordance with the scan order (which may be vertical, horizontal, diagonal, zig zag, or any other scan order prescribed by the applicable coding standard). The scan is typically done in "reverse" order, i.e. starting with the last significant coefficient and working back through the significant map in reverse direction until the flag at [0,0] is reached. In the present description, the term "scan order" is intended to mean the order in which flags, coefficients, or groups, as the case may be, are processed and may include orders that are referred to colloquially as "reverse scan order".

Each significant-coefficient flag is then entropy encoded using the applicable context-adaptive coding scheme. For example, in many applications a context-adaptive binary arithmetic coding (CABAC) scheme may be used. Other implementations may use other context-adaptive codecs with binarization. Examples include binary arithmetic coding (BAC), variable-to-variable (V2V) coding, and variable-to-fixed (V2F) length coding. With 4×4 and 8×8 maps, a context is assigned for each bit position. When encoding the bit (significant-coefficient flag) in that bit position, the assigned context and the context's history to that point determine the estimated probability of a least probable symbol (LPS) (or in some implementations a most probable symbol (MPS)).

In existing video coders, context assignment is predetermined for both the encoder and decoder. For example, with a 4×4 luma block, the current draft HEVC standard prescribes that each bit position in the 4×4 significance map has a unique context. Excluding the last position, that means 15 contexts are tracked for encoding of 4×4 luma significance maps. For each bit position, the context assigned to that position determines the estimated probability associated with an LPS in that position. The actual bit value is then encoded using that estimated probability. Finally, the context assigned to that position is updated based on the actual bit value. At the decoder, the encoded data is decoded using the same context model. A context for each bit position is tracked and used to determine the estimated probability for decoding data to recover bits for that position.

With 16×16 and 32×32 significance maps, the context for a significant is (mostly) based upon neighboring significant-coefficient flag values. Among the 13 contexts used for 16×16 and 32×32 significance maps, there are certain contexts dedicated to the bit position at [0,0] and to neighboring bit positions, but most of the significant-coefficient flags take one of five contexts that depend on the cumulative values of neighboring significant-coefficient flags. In these instances, the determination of the correct context for a significant-coefficient flag depends on determining and summing the values of the significant-coefficient flags at neighboring locations (typically five locations, but it could be more or fewer in some instances). This involves multiple memory accesses, which can be costly in memory bandwidth requirements. Moreover, in many instances the 16×16 and 32×32 significance maps contain a large number of zeros. Accordingly, there is a substantial cost involved in encoding and transmitting large maps that have few coefficient values.

In accordance with one aspect of the present application, the encoder and decoder use multi-level significance maps for certain transform units. In the examples described below, the multi-level significant maps are used for 16×16 and 32×32 sized transform units; however, it will be understood that they may be used for 8×8 or 64×64 or other sized transform units in some embodiments.

The significant-coefficient flags are grouped. Each significant-coefficient flag falls into one of the groups. For simplicity in many embodiments the groups are formed by (conceptually) dividing or partitioning the transform unit structure into blocks. For example, a 16×16 map may be divided into 4×4 blocks each containing sixteen of the coefficient positions. A 32×32 map may be divided into 8×8 blocks each containing sixty-four of the coefficient positions. The significant-coefficient flags are thus grouped on the basis that they fall into these defined blocks in the matrix structure. In another example, both 16×16 and 32×32 maps may be divided into 4×4 blocks each containing sixteen of the coefficient positions.

FIG. 3 shows an example 16×16 transform unit 100 (the matrix of quantized transform domain coefficients). For indexing purposes, the bit position within the transform unit may be specified by [xC,yC], wherein xC=0, 1, 2, . . . 15 and yC=0, 1, 2, . . . 15. Using (for example) a diagonal scan order, it will be noted that the last-significant coefficient in this example is at [12, 10], as indicated by reference numeral 112.

Figure 4:
FIG. 4 shows an example significance map containing significant-coefficient flags for the transform unit of FIG. 3.

Reference is now also made to FIG. 4, which shows an example significance map 102. The significance map 102 contains the significant-coefficient flags that are generated from the example transform unit are shown in FIG. 4. It will be noted that a significant-coefficient flag appears in every bit position in the scan order from [0,0] up to, but excluding, the last-significant coefficient at [12, 10]. The significant-coefficient flag at each bit position for which there is a non-zero coefficient in the transform unit 100 is set to 1, whereas each significant-coefficient flag at each bit position at which there is a zero coefficient is set to zero.

The significance map 102, i.e. the set of significant-coefficient flags, may be grouped based upon a uniform division of the transform unit structure into contiguous blocks in one embodiment. The size of the transform unit may determine the size of the blocks. In the case of a 16×16 transform unit, the blocks may be 4×4 in some embodiments. The groupings are illustrated in FIG. 4 by the lines demarking the 4×4 blocks. A larger transform unit, such as a 32×32 transform unit may have its significant-coefficient flags grouped into 4×4 blocks, 8×8 blocks, or other size contiguous blocks. In one embodiment, 4×4 coefficient groups are used for transform units of sizes 16×16, 4×16, 16×4, 8×32, 32×8, and 32×32.

Although the examples given herein use groups defined as contiguous square blocks for simplicity, the present application is not limited to square groups. Groups may be formed as rectangular blocks in some embodiments. In yet other embodiments, other shapes may be used. For example, with a diagonal scan order, it may be advantageous to use groups formed from diagonal slices of the transform unit, in which case some of the groups may be somewhat trapezoidal in shape. For example, rectangular groups may be used with horizontal or vertical scan orders. In one example, with an 8×8 transform unit, 2×8 coefficient groups may be used if a horizontal scan is employed, and 8×2 coefficient groups may be used if a vertical scan is employed. Other variations will be understood by those skilled in the art.

A higher level significance map corresponding to the matrix of groups may then be generated. The higher level significance map is an ordered set of significant-coefficient-group flags. There is one significant-coefficient-group flag for each group containing at least one significant-coefficient flag. The group containing the last-significant coefficient need not be included in the higher level significance map because it will already be known to contain at least one non-zero coefficient, i.e. the last-significant coefficient. The significance map may be referred to as the level 0, or L0, map. The higher level significance map (i.e. containing the significant-coefficient-group flags) may be referred to as the level 1, or L1, map.

Figure 5:
FIG. 5 shows an example L1 significance map containing significant-coefficient-group flags for the significance map of FIG. 4.

FIG. 5 illustrates the L1 higher level significance map 104 corresponding to the example significance map 102 shown in FIG. 4. It will be noted that the L1 map 104 contains a significant-coefficient-group flag for each group that contains at least one significant-coefficient flag. If any of the significant-coefficient flags within the group are non-zero, then the significant-coefficient-group flag is set to one. Otherwise, it is set to zero.

Indexing of the groups may be specified by [xCG, yCG], wherein in this example xCG=0, 1, 2, 3 and yCG=0, 1, 2, 3. The group containing the last-significant coefficient is at [3, 2]. The group at [3,3] does not contain any significant-coefficient flags, so it is not included in the L1 map.

The significant-coefficient-group flags may be converted to vector form in a scan order, in some embodiments. The scan order may be the same as the scan order specified for use with the transform unit generally. In one embodiment, the significant-coefficient-group flag may use a predefined scan order than may be different from the selected scan order for the transform unit. In some cases, the L1 map may exclude certain groups like the [0, 0] group or the last-significant-coefficient group, which will have a presumed flag value, as will be described further below.

It will be appreciated, that the L1 map need not be derived directly from the L0 map, but rather could be derived from scanning the coefficients in the transform unit in the scan order.

It will also be appreciated that further higher level maps may be used in some embodiments. For example, if the transform unit is a 64×64 transform unit, the L1 map may be based on dividing the transform unit into 256 4×4 groups. Thus the L1 map would be a 16×16 map containing L1 group flags. A further L2 map may be generated by grouping the L1 flags into a further set of 4×4 blocks (each of which would correspond to a group of 16×16 coefficients from the transform unit). Additional levels of abstraction and/or granularity may be employed in other embodiments.

Figure 6:
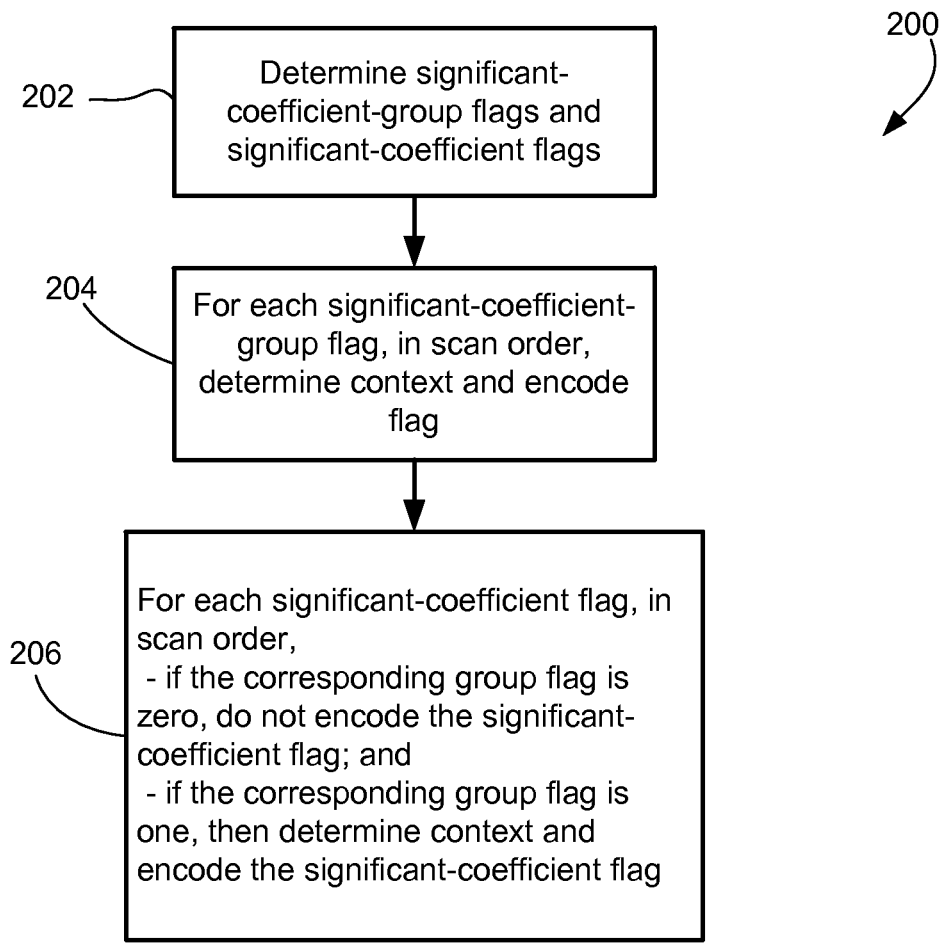
FIG. 6 shows, in flowchart form, an example method of encoding significant-coefficient flags.

Reference is now made to FIG. 6, which shows, in flowchart form, an example process 200 for encoding significant-coefficient flags. The process 200 begins in operation 202 with the encoder determining the significant-coefficient flags and the significant-coefficient-group flags. In one embodiment, the encoder scans the transform block in the scan order to determine the last-significant coefficient and the set of significant-coefficient flags. The significantcoefficient-group flags may be determined during the same scan (although a certain amount of buffering of values may be used in practical implementations as the scan order may involve crossing through multiple blocks; in some cases, the determination of the significant-coefficient-group flag is made when the encoder determines it has scanned the last coefficient for that group, e.g. the exit coefficient). In some implementations, the encoder may perform a second scan of either the L0 significance map or of the transform unit to determine the significant-coefficient-group flags.

In operation 204, for each significant-coefficient-group flag, the encoder determines the context to use and then entropy encodes that significant-coefficient-group flag based on the determined context. The significant-coefficient-group flags may be processed in a prescribed order. In some embodiments, the prescribed order is the same as the scan order for the transform unit. The number of contexts and their determination may be structured in any suitable manner. An example set of contexts and method for determining contexts for significant-coefficient-group flags is described later below.

Having encoded the set of significant-coefficient-group flags, the encoder then encodes the significant-coefficient flags. In operation 206, the encoder (working in scan order) determines the context of and encodes each significant-coefficient flag if that significant-coefficient flag falls in a group for which the significant-coefficient-group flag is set to 1. If the corresponding significant-coefficient-group flag is set to zero, then any of the significant-coefficient flags in that group are not encoded, i.e. they are skipped during the entropy encoding process.

Accordingly, after the process 200 the encoder has produced a bitstream of encoded data which contains the encoded significant-coefficient-group flags and the encoded significant-coefficient flags that fall into a group that has at least one non-zero significant-coefficient flag. The bitstream does not include any significant-coefficient flags from any group that does not have at least one non-zero significant-coefficient flag.

Figure 7:
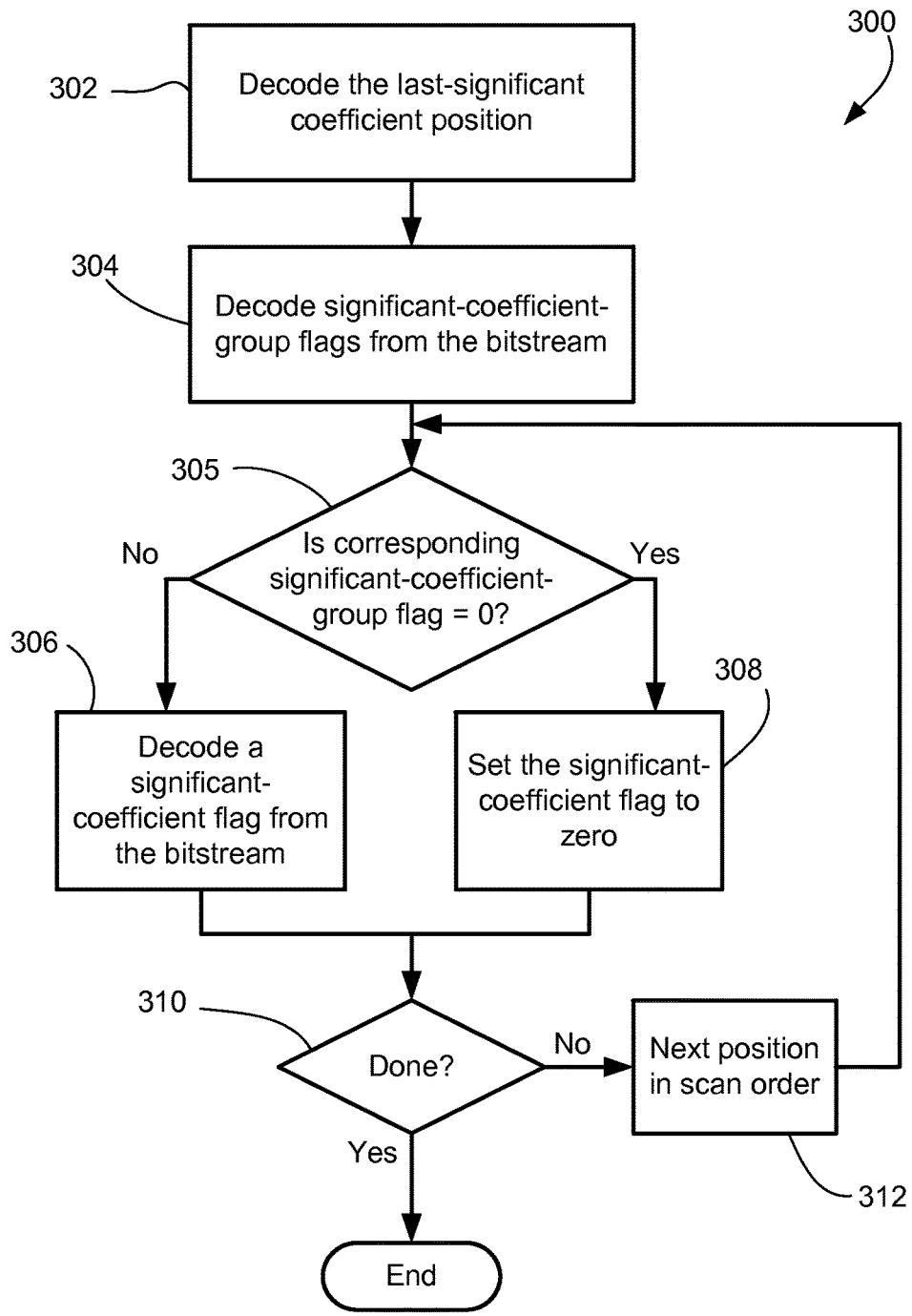
FIG. 7 shows, in flowchart form, an example method for reconstructing a significance map from encoded data.

At the decoder, the significant-coefficient flags need to be reconstructed from the encoded data of the bitstream. Reference is now made to FIG. 7, which shows, in flowchart form, an example process 300 for reconstructing significant-coefficient flags from a bitstream of encoded data. The bitstream may be received through a network connection, i.e. streamed, or read from a computer-readable medium, such as a memory (e.g. flash memory, etc.) or a storage disk (e.g. DVD, BluRay™, CD-ROM, etc.). The process 302 is applied in the process of reconstructing a transform unit at a decoder. Not shown is the decoding of header information, both for the sequence and for each slice or picture (depending on the syntax of the video coding standard in use).

In operation 302, the position of the last-significant coefficient is decoded from the bitstream. This information may be represented in any applicable syntax. Some standards provide that the last-significant coefficient is to be specified using matrix notation, e.g. x- and y-based location within the transform unit; some standards provide that the last-significant coefficient is to be signaled using a vector of 0's with a 1 at the last-significant coefficient position, wherein the vector is mapped to the transform unit by the scan order. Any suitable syntax for specifying the last-significant coefficient may be used in operation 302.

In operation 304, the significant-coefficient group flags are decoded from the bitstream. The significant-coefficient group flags may have been entropy encoded using whatever applicable binarization scheme is specified by the standard or specified in the header information. For example, context-adaptive binary arithmetic coding may be used in some instances. The significant-coefficient group flags are decoded by determining the context for each flag position (bit position in the higher level significance map—e.g. the L1 significance map), and then decoding the flag value from the bitstream and updating the context based on the flag value. The size of the set of significant-coefficient-group flags is known because the scan order is known and the last-significant coefficient was identified in operation 302; thus, the size of the L1 significance map is determined. In the case of non-evenly partitioned groups, a suitable signaling of the group sizes and positions may be provided in the syntax.

As noted above, each significant-coefficient-group flag corresponds to a respective one of the contiguous groups defined for the transform unit. One or more of the significant-coefficient flags fall into each of these groups having a significant-coefficient-group flag. Accordingly, each significant-coefficient-group flag corresponds to a respective group of the significant-coefficient flags.

After decoding the set of significant-coefficient-group flags, then the remaining operations for reconstructing the significance map, i.e. the set of significant-coefficient flags, is performed in the prescribed scan order. The processing begins from the last-significant coefficient (but excluding that last-significant coefficient position, since it is already known to contain a non-zero coefficient). In operation 305, for each significant-coefficient flag the decoder determines whether its corresponding significant-coefficient-group flag is zero. If the corresponding significant-coefficient-group flag is non-zero, then a significant-coefficient flag is decoded from the bitstream as indicated by operation 306. That is, if the associated or corresponding significant-coefficient-group flag indicates that the group may contain at least one non-zero coefficient, then the decoder decodes a significant-coefficient flag from the bitstream for the current position.

If the associated or corresponding significant-coefficient-group flag is a zero, i.e. it indicates that there are no non-zero coefficients in the group, then the decoder sets or reconstructs the current significant-coefficient flag as a zero, as indicated by operation 308. It does not decode it from the bitstream.

At operation 310, the decoder determines whether it has reach the end of the scan order, i.e. the coefficient at the upper left corner of the transform unit, e.g. [0,0]. If so, then the process 300 ends; if not, then the decoder moves to the next position in the scan order in operation 312 and repeats operations 306 and 308 to reconstruct the significant-coefficient flag for that next position.

It will be appreciated that, in this embodiment, the scan order does not result in reconstructing all significant-coefficient flags of a group before moving onto the next group. Rather, the scan order (depending on the scan order and the group geometry) scans across group boundaries such that the decoder reconstructs a few flags from one group, a few from an adjacent group, etc., working its way back to the [0,0] position in the scan order. A scanning process will be described further below that avoids this issue.

There may be special cases that are accounted for in the encoding and decoding processes to save bits. For example, as noted above, the group containing the last-significant coefficient will always have a significant-coefficient-group flag that indicates a non-zero coefficient, so that significant-coefficient-group flag does not need to be encoded and transmitted to the decoder. The encoder always encodes the significant-coefficient flags for that group, and the decoder is configured to always decode the significant-coefficient flags for that group.

Another special case that may be included in some embodiments is to always encode and decode the first group. This group contains the DC coefficient at [0, 0] in the transform unit. The probability of this group containing no non-zero coefficients is extremely low. Accordingly, instead of transmitting a significant-coefficient-group flag for the [0, 0] group, the encoder may be configured to always encode the significant-coefficient flags of that group and the decoder may be configured to always decode the significant-coefficient flags of that group.

Yet another special case that may be implemented in some embodiments is also based on probability. It has been noted that when the group to the right and the group below a particular group both contain non-zero coefficients, then the probability that the particular group contains a non-zero coefficient is very high. Therefore, in some embodiments, the encoder and decoder may presume that any group that has a right neighboring group and lower neighboring group that both contain non-zero coefficients, then that group has non-zero coefficient. Thus, with respect to a certain group, if the significant-coefficient-group flag for the group to the right is set to 1, and if the significant-coefficient-group flag for the group below is set to 1, then the encoder does not encode a significant-coefficient-group flag for the certain group and always encoder the significant-coefficient flags for the certain group. The decoder recognizes that the right and lower neighbors have significant-coefficient-group flags indicating non-zero coefficients, so it will automatically assume that the certain group has non-zero coefficients and it will decode the significant-coefficient flags.

Figure 8:
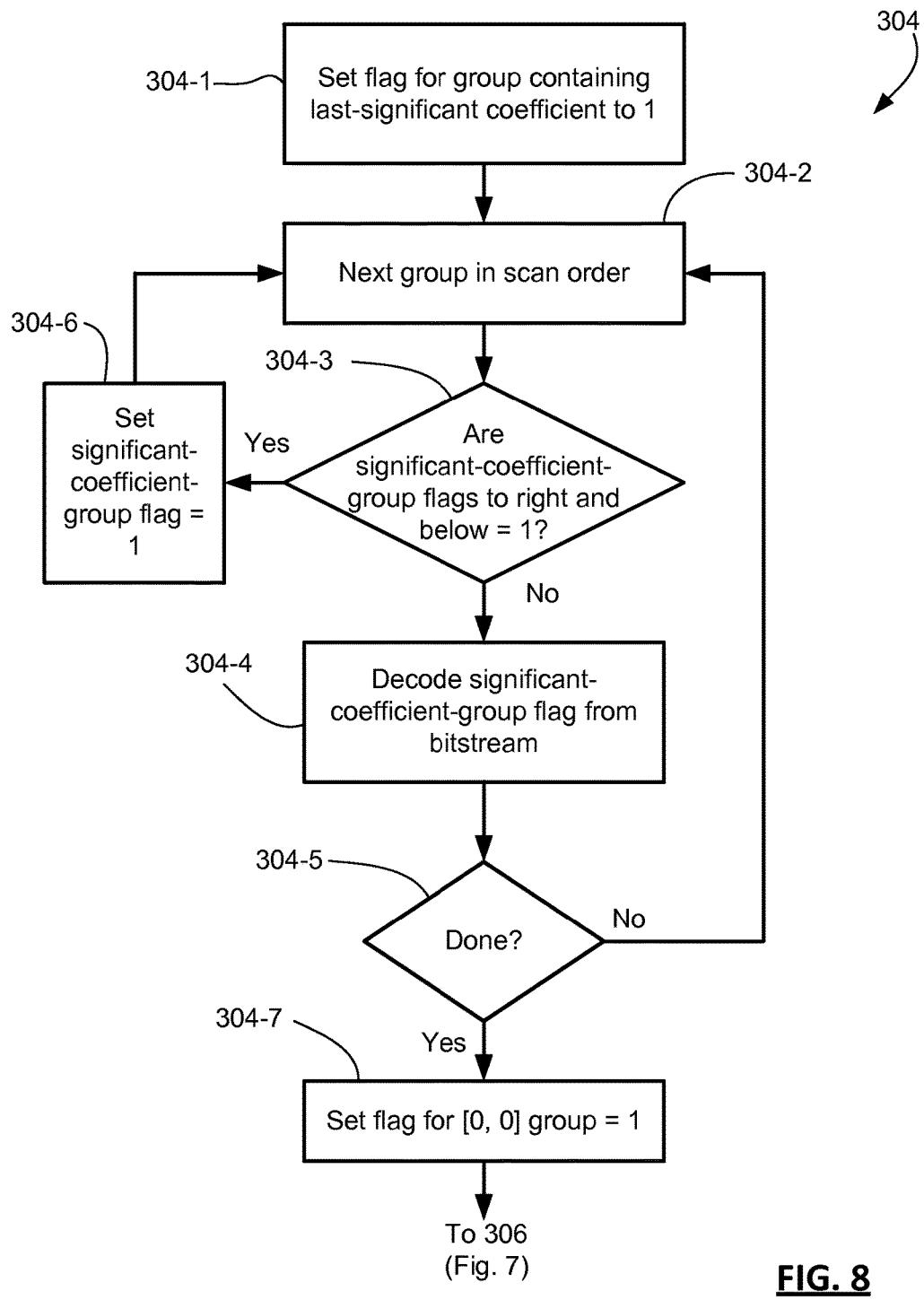
FIG. 8 shows, in flowchart form, an example process for decoding and reconstructing significant-coefficient-group flags.

Reference is now made to FIG. 8, which shows operation 304 from FIG. 7 with additional detail to reflect an example embodiment of the handling of the special cases described above. The operation 304 includes an operation 304-1 in which the significant-coefficient-group flag for the group containing the last-significant coefficient is set to 1. The location of the last-significant coefficient is decoded from the bitstream in an earlier operation (not shown).

The decoder then moves through the groups in the scan order. As noted in operation 304-2, the decoder moves from to the next group in the scan order from the group containing the last-significant coefficient. For this group, the decoder assesses whether the significant-coefficient-group flag for the group to the right and the significant-coefficient-group flag for the group below the current group are equal to 1. Initially, the decoder will not have flags to the right and below because it has just started, but later in the scan order (whether horizontal, vertical, or diagonal) the decoder may sometimes have reconstructed significant-coefficient-group flags in these positions relative to the current group (for groups located at the bottom edge of the transform unit, the decoder may not ever have a flag for a group below). If those two adjacent groups are set to 1, then the probability of the current group also being set to 1 is sufficiently high that both the encoder and decoder presume that it is set to one. Accordingly, in operation 304-6, the decoder sets the significant-coefficient-group flag to 1 if the special case condition is met. Otherwise, the decoder moves on to operation 304-4. In another embodiment, this special case may modified to be based on the significant-coefficient-group flags of other adjacent groups, or other groups altogether.

In operation 304-4, the decoder decodes the significant-coefficient-group flag for the current group from the bitstream. The decoding includes determining the context and then decoding in accordance with the determined context. The decoding may be based on binary arithmetic coding (BAC), or other binarized coding/decoding processes.

In operation 304-5, the decoder determines whether this is the next-to-last group in the scan order. If not, then the decoding is not yet finished, so the decoder cycles back to operation 304-2 to advance to the next group in the scan order. If it is the next-to-last group in the scan order, then the decoder moves on to operation 304-7 where the decoder sets the significant-coefficient-group flag for the last group, i.e. group [0,0], to 1. This is based on the special case in which that particular group is always presumed by the encoder and decoder to have at least one non-zero coefficient, so the significant-coefficient-group flag is always preset to 1 so that the significant-coefficient flags for that group are always encoded and decoded. After this operation, the decoder goes on to operation 306 or 308 (FIG. 7).

It will be appreciated that the above example process illustrated in FIGS. 7 and 8 the decoding of the L1 significance map (the significant-coefficient-group flags) and the decoding of the L0 significance map (the significant-coefficient flags) as a two-stage process in which the L1 significance map is fully decoded and the L0 significance map is then decoded. In some embodiments this may be the case; however, in some other embodiments, the decoding processes may be partly intertwined. That is, the decoding of the L0 map may begin before the L1 map is fully decoded. It will be appreciated that in some embodiments the decoding of the L0 significance map may begin as soon as the first significant-coefficient-group flag has been reconstructed.

In some embodiment, multi-level significance map coding may be turned on and off depending on, for example, picture type. For instance, multi-level significance map coding may be enabled for I- and P-pictures, but disabled for B-pictures.

Multi-Level Scan Order

As outlined above, when coefficient groups are formed as illustrated in the above examples, i.e. in contiguous blocks, the scan order (vertical, horizontal or diagonal) will result in crossing the boundaries of the groups when scanning the significant-coefficient flags. This might create difficulties in encoding and decoding from a hardware implementation perspective because significant buffering of data may be needed to keep track of significant-coefficient flags of partially-decoded groups in order to implement a one-pass scan. Otherwise, it may be necessary to scan twice (or more): one scan order pass for flags of the L1 map and one scan order pass for the L0 map. One option for implementing a one-pass scanning process and avoiding some of the memory and computational complexity issues is to use a group-based or multi-level scanning order.

Figure 14:
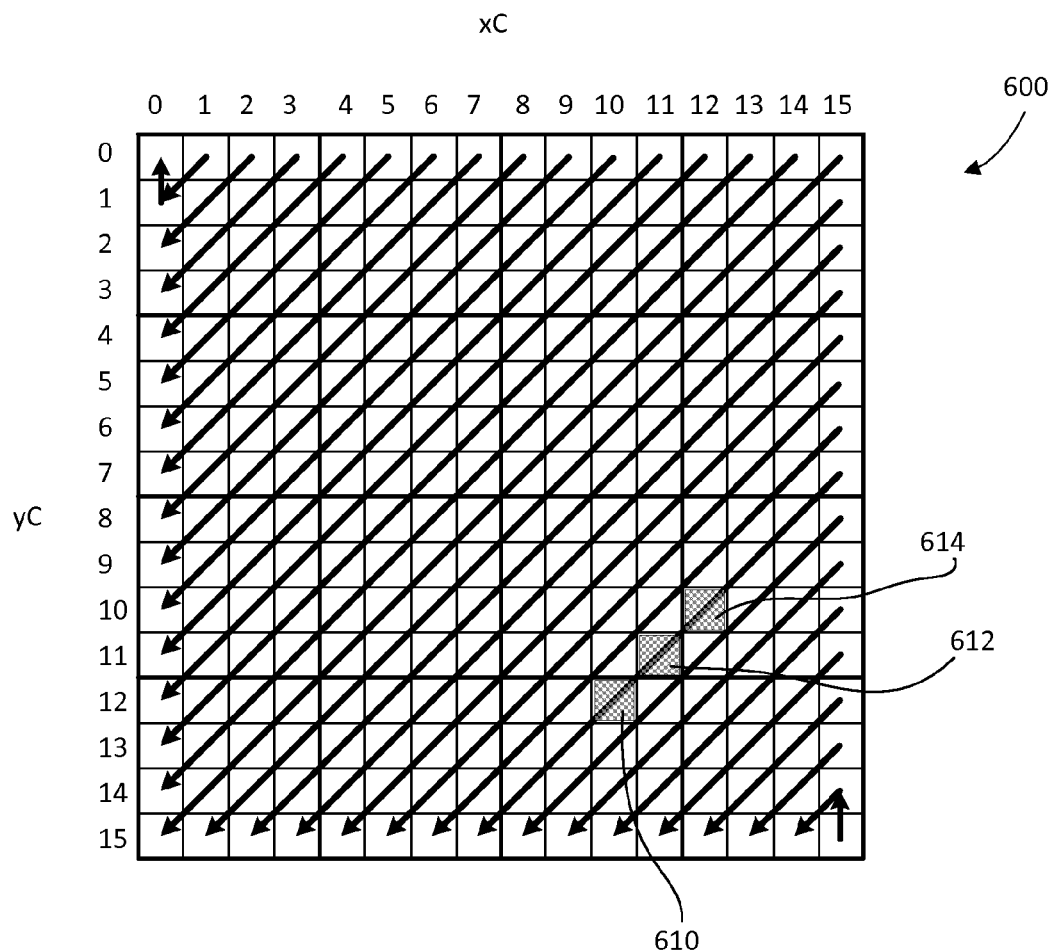
FIG. 14 shows a 16×16 transform unit with 4×4 coefficient groups and a forward diagonal scan order.

Referring now to FIG. 14, an example 16×16 transform unit 600 is illustrated. In the context of significant map encoding, the example 16×16 transform unit 600 includes 16 coefficient groups, where each coefficient group is a 4×4 block of significant-coefficient flags. A diagonal scan order is illustrated in FIG. 14. The scan order begins with the significant-coefficient flag at [15,15] and the diagonal scan is from upper right to lower left while traversing the transform unit 600 from the lower right [15, 15] to the upper left [0, 0]. As discussed above, the significance map encoding process uses a scan order starting from the last significant coefficient.

It will be noted that the scanning order cuts across coefficient group boundaries. For example, consider the significant-coefficient flags at [10, 12], [11, 11], and [12, 10], as indicated by reference numerals 610, 612, and 614, respectively. In the scan order, the encoder and decoder first encounter the significant-coefficient flag 614 at position [12, 10]. The scan order then encounters the significant-coefficient flag 612 at position [11, 11], which is the first significant-coefficient flag in that coefficient group. Then the scan order then crosses into another coefficient group when it reaches significant-coefficient flag 610 at position [10, 12].

At the encoder side, it will be appreciated that this frequent crossing of coefficient group boundaries can result in significant buffering during the scanning process to track the values of significant-coefficient flags in various coefficient groups, and that a determination as to the significant-coefficient group flag for that coefficient group may need to wait until the last (upper left) significant-coefficient flag in the group has been reached in the scan order. In order to process the whole transform unit 600 in a one-pass scan, the encoder may require some complex buffering to avoid excessive memory access operations. The frequent crossing of the coefficient group boundaries presents a particular complication for rate-distortion-optimized quantization (RDOQ), i.e. soft-decision quantization (SDQ). Tracking the rate costs associated with encoding when making RDOQ/SDQ determinations become significantly more complex. At the decoder side, the decoder too may require buffering to track the previously-decoded significant-coefficient-group flags for the various groups as the decoder traverses them in scan order re-constructing the significant-coefficient flags. This results in greater memory/buffer requirements at the decoder.

Figure 15:
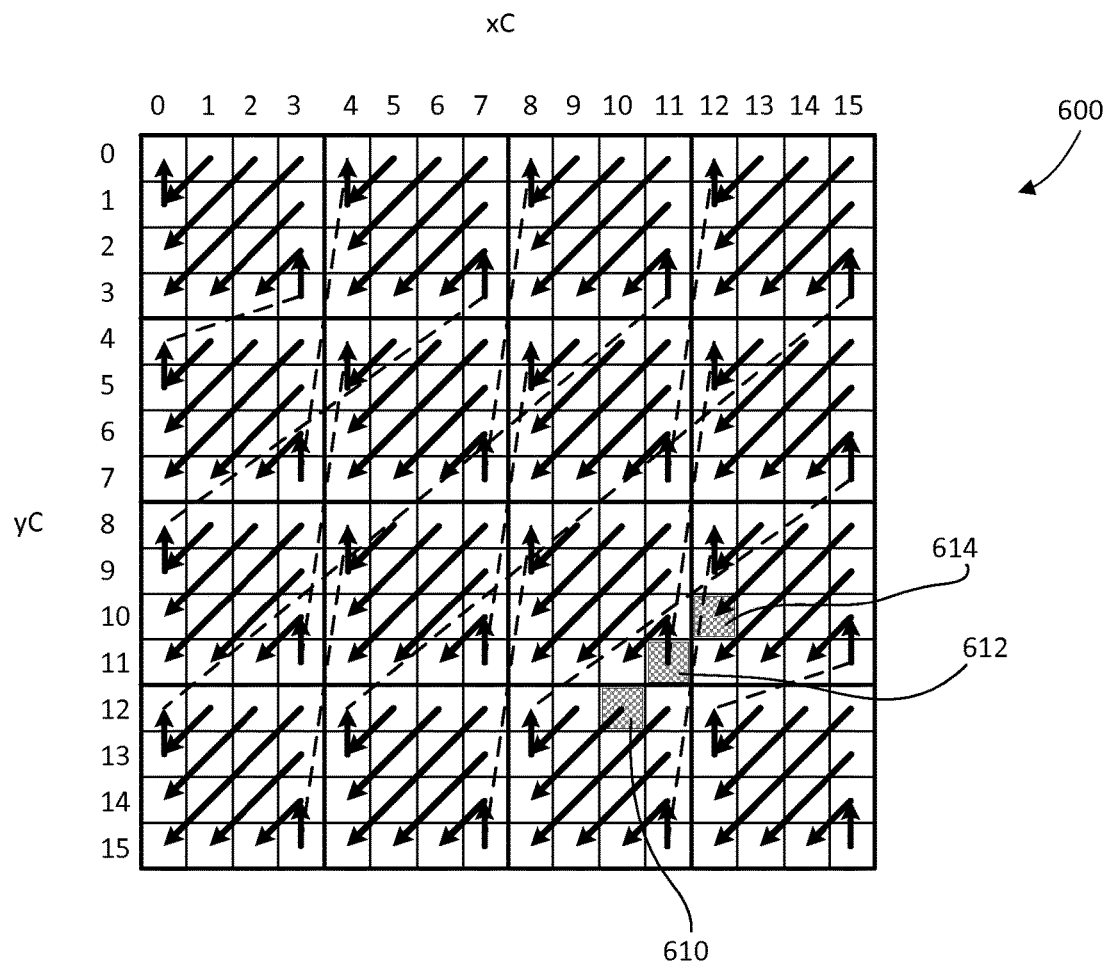
FIG. 15 shows the 16×16 transform unit with 4×4 coefficient groups and a group-based multi-level forward diagonal scan order.

Accordingly, in one embodiment the encoding and decoding processes may employ a multi-level scanning order. Reference is now made to FIG. 15, which shows the transform unit 600 of FIG. 14 with a multi-level diagonal scan order illustrated. Within each coefficient group, a diagonal scan order is applied at the group-level, rather than across the whole transform unit 600. The coefficient groups themselves are processed in a scan order, which in this example implementation is also a diagonal scan order.

It will be appreciated that diagonal is one option, and in other embodiments horizontal, vertical, zig-zag, or other scan orders may be applied, within the coefficient groups and/or at the group-level for ordering the processing of the coefficient groups.

Using the group-based or multi-level scanning order, each group of significant-coefficient flags is encoded and decoded in order. That is, the encoding/decoding of the next group of significant-coefficient flags only begins once the encoding/decoding of the present group has been completed. For example, using a diagonal group scan order, the entire group of significant-coefficient flags that contains the significant-coefficient flag 614 at position [12, 10] is decoded before the decoder starts decoding the group of significant-coefficient flags that contains the significant-coefficient flag 610 at position [10, 12]. Similarly, both those groups are completely decoded before the decoder starts decoding the group containing the significant-coefficient flag 612 at position [11, 11]. This permits the encoder/decoder to more easily process the multi-level significance map in one pass since all significant-coefficient flags of a coefficient group are processed sequentially in scan order within the group.

Advantageously, the multi-level or group-based scanning order further facilitates the interleaving of significant-coefficient-group flags within the bitstream. As each coefficient group is processed in scan order, the encoder may write the significant-coefficient-group flag to the bitstream and may then insert the significant-coefficient flags for that coefficient group if the significant-coefficient-group flag is non-zero. At the decoder, the decoder decodes the significant-coefficient-group flag from the bitstream and, if non-zero, then decodes the significant-coefficient flags for that group in scan order within the group. If the significant-coefficient-group flag is zero, then it sets all significant-coefficient flags for that group to zero and reads decodes the next significant-coefficient flag from the bitstream. In this manner, it reconstructs the significance map group-by-group in group scan order.

It will be understood that the scan order used within the group does not necessarily need to correspond to the group scan order used for progressing from group to group. For example, within the groups a diagonal scan order may be used while the processing of the groups is done in a horizontal group scan order.

It will also be understood that the multi-level scan order described herein matches with the coefficient grouping used for the multi-level significance map; however, in the more general case the multi-level or group-based scan order may be organized into blocks that do not necessarily correspond to the groups of significant-coefficient flags. For example, with reference to FIGS. 14 and 15, instead of applying a diagonal scan order to each 4×4 coefficient group, in another example implementation the grouping or blocking for the purpose of scan order may use 8×8 blocks. In other words, in this example, the diagonal scan order would be applied to four 8×8 blocks. Note that if there is a mismatch between the grouping used for the multi-level scan order and the coefficient groups used in the multi-level significance map, then the encoder/decoder will not necessarily process each group completely before moving to the next group.

Figure 16:
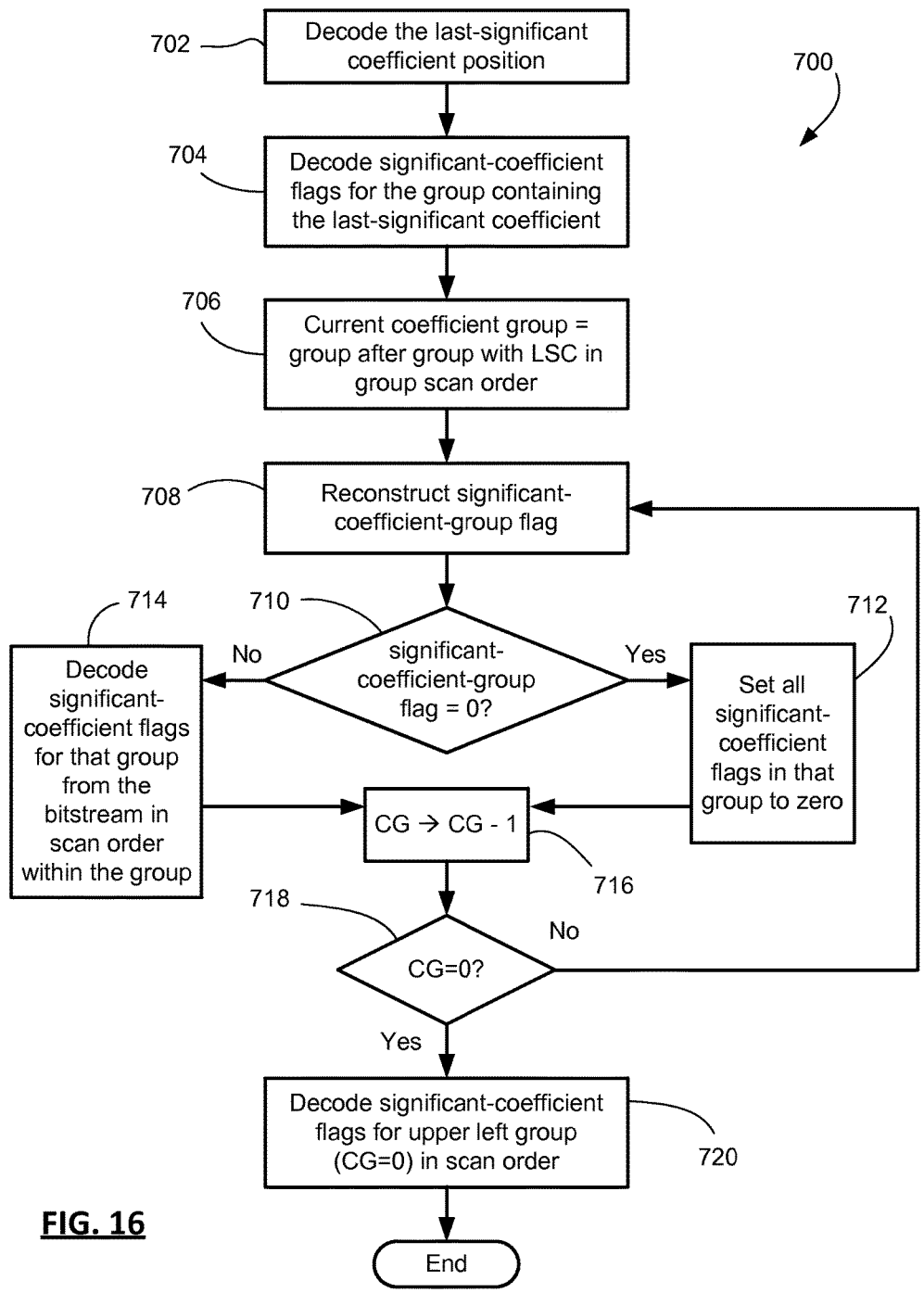
FIG. 16 shows, in flowchart form, an example method for decoding a significance map.

Reference is now made to FIG. 16, which shows an example method 700 for decoding a multi-level significance map using a multi-level scan order. The method 700 is an example process for reconstructing significant-coefficient flags from a bitstream of encoded data. The bitstream of encoded data includes encoded significant-coefficient-group flags. Each significant-coefficient-group flag corresponds to a respective group of significant-coefficient flags. Each non-zero significant-coefficient-group flag in the bitstream is followed by the significant-coefficient flags of its respective group in a scan order.

The method 700 begins with decoding of the last-significant coefficient position from the bitstream in operation 702. As mentioned previously, the last-significant coefficient position may be signaled in any one of a number of ways. Once the last-significant coefficient position is known, then in operation 704 the decoder decodes the significant-coefficient flags from the bitstream for the significant-coefficients within the coefficient group containing the last-significant coefficient. The decoding in operation 704 is performed in a scan order (which may be diagonal, vertical, horizontal, etc.) within the coefficient group, starting with the significant-coefficient position after the position of the last-significant position and working back towards the upper left coefficient in the scan order.

In operation 706, with reference to a group scan order, the current coefficient group (indexed as CG) is set to be the group after the group containing the last-significant coefficient. The group scan order is the order in which the coefficient groups are decoded, starting with the group after the group containing the last-significant coefficient and working back towards the upper left group in the transform unit (the group containing the DC coefficient at position [0,0]) in the group scan order. The group scan order may be vertical, horizontal, diagonal, etc.

In operation 708, the decoder reconstructs the significant-coefficient-group flag for the current coefficient group (indexed as CG). This reconstruction includes decoding the significant-coefficient-group flag from the bitstream, unless a special case applies. For example, one exemplary special case is when the significant-coefficient-group flags for the group to the right and the group below the current coefficient group are both non-zero. In this situation, the significant-coefficient-group flag may be presumed to be non-zero by default.

As indicated by operation 710, if the reconstructed significant-coefficient-group flag is zero, then in operation 712 the significant-coefficient flags of the corresponding coefficient group are all set to zero. If the reconstructed significant-coefficient group flag is non-zero, then in operation 714 the significant-coefficient flags of the corresponding coefficient group are decoded from the bitstream in scan order within that group.

Once all the significant-coefficient flags of the current coefficient group are reconstructed in either operation 712 or 714, then in operation 716, the CG index is decremented to move to the next coefficient group in the group scan order. If, in operation 718, the next coefficient group in the group scan order is CG>0, i.e. it is not the upper left group containing the DC coefficient at [0, 0], then the process returns to operation 708 to fully reconstruct the significant-coefficient of the next coefficient group. However, if CG=0, then the method 700 proceeds to operation 720, where the significant-coefficient flags of the upper left coefficient group are decoded from the bitstream. These significant-coefficient flags are always encoded in the bitstream in this example embodiment, so the decoder presumes that the significant-coefficient-group flag for this coefficient group is effectively always non-zero.

Context-Modeling

To improve coding efficiency, the BAC engine (or other entropy coding/decoding engine) uses contexts. The present application proposes using four new contexts for encoding the significant-coefficient-group flags. Two contexts are for luma encoding/decoding and two are for chroma encoding/decoding.

Determining which of the two contexts applies to a given significant-coefficient-group flag may occur as follows. If the significant-coefficient-group flag for the adjacent group to the right of the current group is zero, and the significant-coefficient-group flag for the adjacent group below the current group is zero, then the context for encoding the significant-coefficient-group flag of the current group is 0. Otherwise, the context is 1. If the flags for those two adjacent groups are not available then the unavailable flags are presumed to =0 for the purpose of context determination.

Note that if a different scan order direction (such as from upper left towards lower right) is used, the context model can be changed to use the significant-coefficient-group flag for the adjacent group to the left of the current group and the significant-coefficient-group flag for the adjacent group above the current group to determine the context.

The context determination process may also include special cases. For example, the upper left group may always be assigned context 1.

There are other possible context models and methods for determining context that may be used. Some examples are given below.

To define notation, let L[i] denote the significance flag of coefficient group i at level L and let N denote the number of the coefficient groups at level L. In general, for a given L and coefficient group i, we use a function c(*) of i and all available L[j] to determine a context C_i for L[i]. The context is thus given by:

$$C\_i = c(i, L[0], L[1], \ldots L[N-1])$$

where j !=i. Note that in order to use L[j] to determine a context for L[i], L[j] itself must be available. Therefore, the selected scan order must guarantee that any L[j] used in c(*) has been determined previously.

In an embodiment similar to the above-described context determination mode, the context may be determined by:

$$C\_i = c(i, L0[0], L0[1], \ldots, L0[15])$$
$$= \text{sum}\{bj * L0[j]\}$$

where j=0, 1, . . . , N and j !=i, bj=1 if coefficient group j is the right or lower neighbor of coefficient group i and bj=0 otherwise. This particular embodiment has 3 contexts (6, if a distinct 3 contexts are used for chroma).

Another embodiment of c(*) is given by:

$$C\_i = c(i, L[0], L[1], \ldots, L[N-1])$$
$$= \text{sum}\{bj * L[j]\}$$

where j=0, 1, . . . , N and j !=i, bj is non-zero if coefficient group j is any neighboring coefficient group of i that has already been determined and bj=0 otherwise. In this embodiment, the weighting coefficients bj may not necessarily be constants.

Another embodiment of c(*) ignores the significant-coefficient-group flag's of other coefficient groups at L and determines the context based solely on the position i of the current coefficient group. This may be expressed as:

$$C\_i = c(i, L[0], L[1], \ldots, L[N-1])$$
$$= i$$

Other context models and processes for determining context may be used with multi-level significance maps.

Below is given an example syntax for the two-context embodiment discussed above. In this example, consider inputs to be the current coefficient group scan position (xCG, yCG), and the previously decoded bins of the syntax element significant_coeffgroup_flag. The output of this process is ctxIdxInc. In this example, the transform unit is presumed to have been divided into sixteen contiguous blocks to form the coefficient groups. For example, a 16×16 TU is divided into 4×4 blocks and a 32×32 TU is divided into 8×8 blocks. In another example, the transform units may be divided into 4×4 blocks or other sized blocks.

The variable ctxIdxInc depends on the current position (xCG, yCG), and previously decoded bins of the syntax element significant_coeffgroup_flag. For the derivation of ctxIdxInc, the following applies.

If xCG is equal to 3, and yCG is equal to 3, ctxIdxInc is set equal to a default context value. In this example embodiment, the default value is ctxIdxInc=44. In other embodiments, it may be another value, including 0.

If xCG is less than 3,and yCG is equal to 3,*ctxIdxInc* is set as *ctxIdxInc*=44+significant_subblock_flag [*xCG*+1][*yCG*]

If xCG is equal to 3,and yCG is less than 3,*ctxIdxInc* is set as *ctxIdxInc*=44+significant_subblock_flag [*xCG*][*yCG*+1]

If xSB is less than 3,and ySB is less than 3,*ctxIdxInc* is set as *ctxIdxInc*=44+
 max{significant_subblock_flag[*xCG*+1][*yCG*], significant_subblock_flag[*xCG*][*yCG*+1]}

The value 44 in the above expressions is one example of a default index value. Other values may be used in other embodiments, including 0.

Rate-Distortion Optimized Quantization

Some encoding processes employ rate-distortion optimized quantization (RDOQ), or what is sometimes referred to as "soft-quantization". RDOQ is a process of determining optimal quantized transform domain coefficients based on a rate-distortion optimization expression. Accordingly, the quantized transform domain coefficients that result from RDOQ may or may not be the same as the quantized transform domain coefficients that were arrived at through the normal transform and quantization process. In some cases, the coefficient values may have been modified by the RDOQ process because the resulting distortion was determined to have been less costly than the consequent savings in transmission cost.

The RDOQ process normally evaluates four costs in determining the rate component. The four rate costs include the last position rate, the significance rate (L0 rate), the coefficient rate, and the coded block parameter (CBP) rate. To implement multi-level significance maps, it may be advantageous to modify RDOQ to also include the higher-level significance rate (e.g. L1 rate) in the RDOQ calculation.

In one embodiment the RDOQ process may be modified to perform a two-stage RDOQ with regard to significance maps. First, the RDOQ process is applied to determine the best last position and coefficient values and, thus, the L1 significant-coefficient flags. In a second stage, with the last position fixed, the RDOQ process may then be applied again with regard to the L1 rate to determine whether there is a rate-distortion (RD) cost justification for zeroing any coefficients.

Figure 9:
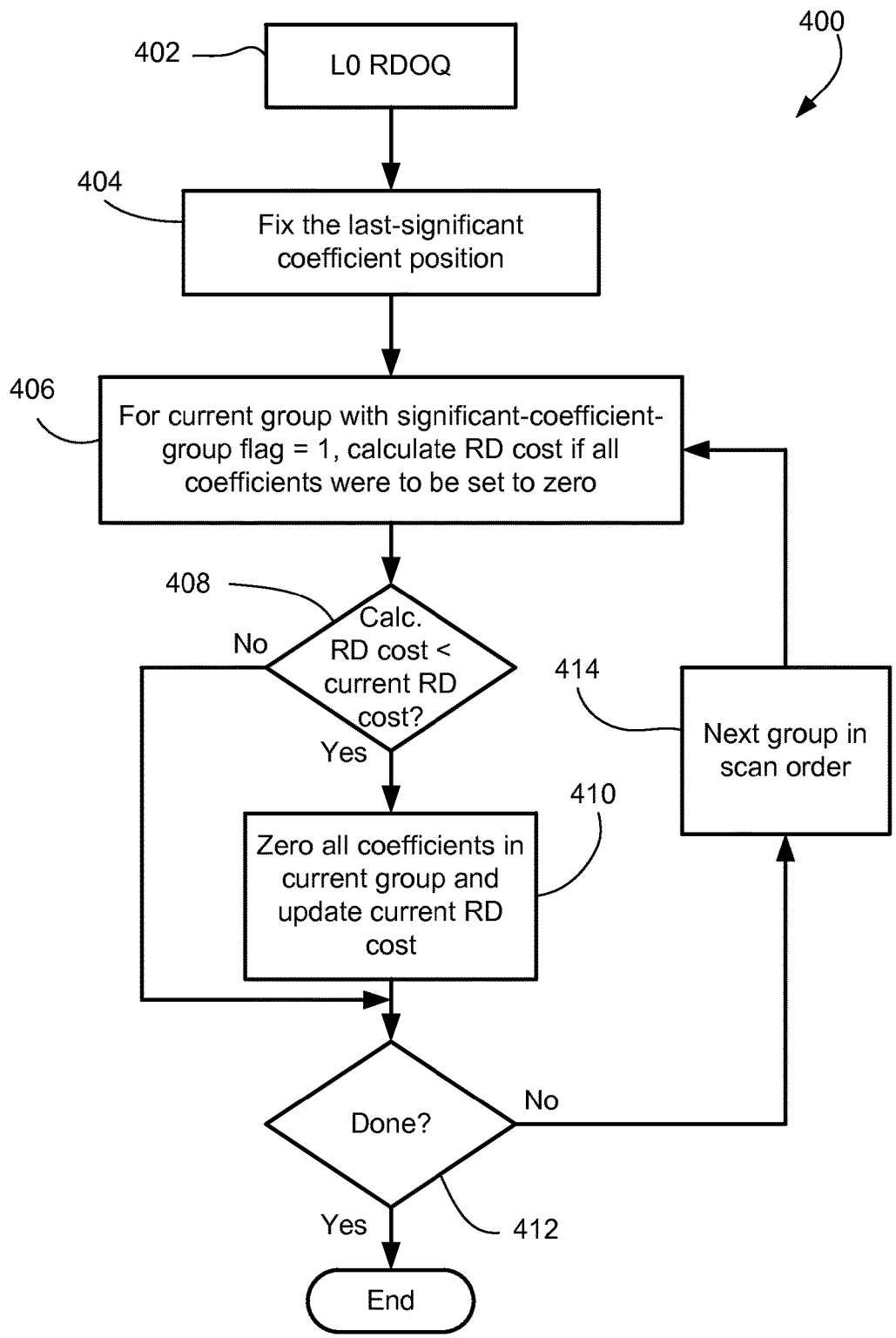
FIG. 9 shows, in flowchart form, an example rate-distortion optimized quantization process for multi-level significance map encoding.

FIG. 9 shows, in flowchart form, an example RDOQ process 400 for encoding of multi-level significance maps. The process 400 uses RDOQ to obtain the optimal quantized transform coefficients and to determine the position of the last significant coefficient, i.e. a L0 RDOQ. The process 400 then fixes the last position and adjusts the current RD cost to account for the effect of the additional levels of significance maps. Then, it uses a greedy approach to further optimize the transform coefficients.

Operation 402 reflects the use of RDOQ to obtain optimal quantized transform domain coefficients, which provides a last-significant coefficient position. Operation 402 results in a certain RD cost based on the rates for transmitting the last position, significance map corresponding to the optimal coefficients, the coefficient values, and CBP.

In operation 404, the last significant position is fixed. That is the last group will contain a non-zero coefficient, i.e. the last significant-coefficient-group flag is fixed at 1. The encoder then greedily determines whether costs savings are found by zeroing coefficients in other groups. The process 400 may be performed in the scan order in some embodiments, although it could be processed in another order.

In operation 406, starting with the next-to-last group as the current group, the encoder determines whether the current group has a significant-coefficient-group flag=1. If not, then the group contains only zeros already and the encoder skips to the next group. If the significant-coefficient-group flag=1, then the encoder calculates an RD cost that would result if all coefficients in the current group were zeros. In operation 408, the encoder assesses whether the RD cost newly calculated is better than (e.g. lesser than) the current RD cost. If so, then in operation 410 all coefficients in the current group are zeroed, and the current RD cost is updated to reflect the change. In operation 412, the encoder assesses whether it is done with the L1 RDOQ, e.g. whether it has reached the group just before the [0, 0] group (the [0, 0] group does not get zeroed if the encoder and decoder are configured to presume there is at least one non-zero coefficient in that group, as described in the special cases outlined above). If there are further groups to assess, then the process 400 continues at operation 414, where the encoder moves to the next group (using scan order in some embodiments).

The RDOQ process will now be illustrated by way of an example. References will again be made to the example given above in connection with FIGS. 3, 4 and 5. Prior to L1 RDOQ, but after L0 RDOQ, the optimal quantized transform domain coefficients are shown in FIG. 3. The corresponding L0 significance map is shown in FIG. 4, and the L1 significance map is shown in FIG. 5.

Figure 11:
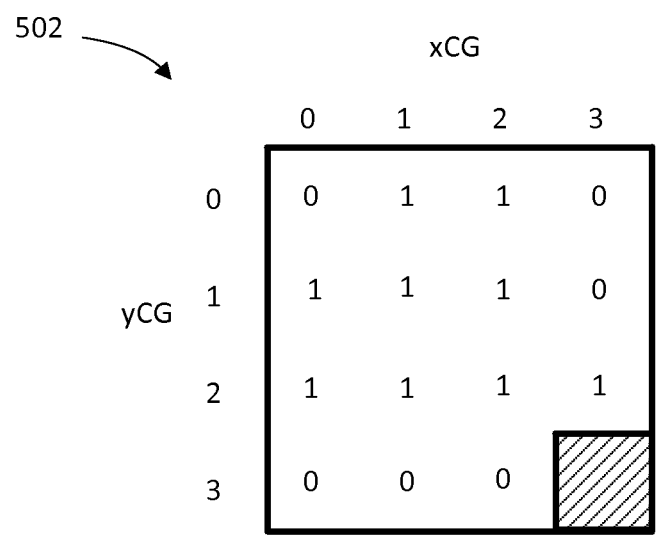
FIG. 11 shows the L1 significance map corresponding to the L0 significance map of FIG. 10, after L1 RDOQ.

The L1 RDOQ process may result, for example, in an optimized L0 significance map 500 shown in FIG. 10, and the associated or corresponding L1 significance map 502 shown in FIG. 11.

It will be noted that the significant-coefficient flags in the last-significant group, i.e. the [3, 2] group, are unchanged. However, the [3, 0] group, the [0, 3] group, and the [1, 3] group have all been zeroed. As a result, the corresponding significant-coefficient-group flags for these three groups have been changed to zeros as well, as indicated in FIG. 11. The result is that the encoder will not need to encode these three groups. The distortion that results from zeroing the few coefficients that were found in those groups is outweighed by the cost savings in reducing the number of encoded bits, as determined by the RDOQ assessment.

In one possible embodiment, the RDOQ process can be extended to determine the optimal coefficient group size for the current TU. In this embodiment, the process 400 is repeated for multiple rounds, with each round assuming a different coefficient group size and with operation 410 modified so that transform coefficients are not actually set to 0. Essentially, in each round, this modified RDOQ process calculates the RD cost for a particular coefficient group size. After all rounds have completed, the RDOQ selects the coefficient group size that yields the least RD cost and finally, sets any transform coefficients to 0 as required. The encoder encodes the value of the optimal coefficient group size into the bitstream so that it can be obtained and used by the decoder.

The coefficient group sizes that are tested may be based upon the transform unit size. For example, a 32×32 transform unit may test group sizes 8×8, 4×4 and 2×2. The groups to be tested may be selectable, and the encoder may indicate (for example in the sequence header) what group sizes will be tests for each transform unit size. Suppose, for example, that the encoder and decoder have agreed that for 16×16 TUs, the modified RDOQ will test two different coefficient group sizes: 2×2 and 4×4, denoted by 1 and 0, respectively. If the modified RDOQ determines that 2×2 is optimal, the encoder encodes a bin 1 into the bitstream before the significant-coefficient-group flags. The decoder decodes this bin before the significant-coefficient-group flags and knows that the coefficient group size for the current TU is 2×2.

In another embodiment the RDOQ process takes advantage of the multi-level scan: L1/L0 RDOQ is performed in a group by group manner followed by determining the last position. Specifically, an exemplary RDOQ process for a 16×16 TU, 4×4 coefficient groups, and a multi-level scan over 4×4 groups, is as follows.

Step 1: Set nCG=15 (start from the last coefficient group).

Step 2: Do L0 RDOQ for each coefficient in the coefficient group at group position nCG following the scan order within the group as specified by multi-level scan.

Step 3: If the resulting coefficient group after Step 2 has non-zero coefficients, nCG is greater than 0, and either the right neighbor or the below neighbor has its significant coefficient group flag set to zero, do L1 RDOQ for the coefficient group: 1) calculate the RD cost setting the L1 flag to zero for the present coefficient group; 2) if the cost is smaller than the RD cost resulting from Step 2, set all coefficients in the coefficient group to zero, and the significant coefficient group flag of the present group to 0.

Step 4: Decrease nCG by 1.

Step 5: Repeat Steps 1-4 until nCG is equal to 0.

Step 6: Determine the last position minimizing the RD cost.

Figure 17:
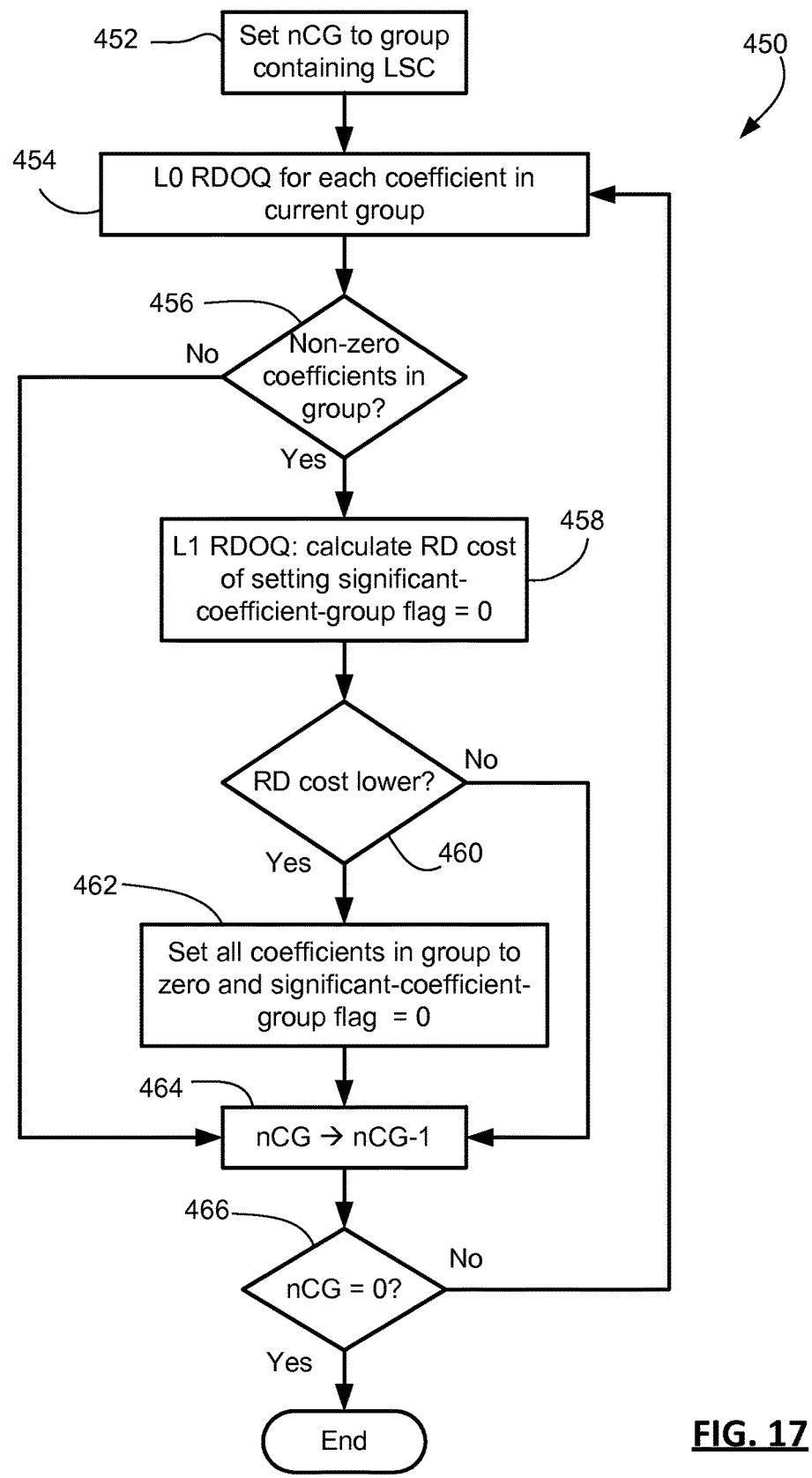
FIG. 17 shows, in flowchart form, an example process for encoding of a multi-level significance map with a multi-level scan order.

FIG. 17 illustrates this example in flowchart form showing example process 450 for RDOQ encoding of a multi-level significance map with a multi-level scan order. The process 450 includes a first operation 452 of setting the number of coefficient groups nCG based on the group containing the last significant coefficient. In operation 454, a L0 RDOQ process is performed on the coefficients within the current coefficient group; that is, rate-distortion optimization is used to determined optimal coefficient values for each coefficient in the current group. In operation 456, if there are no non-zero coefficients, then the process 450 skips to operation 464 to move to the next coefficient group in the scan order and cycle back to operation 454 to perform L0 RDOQ on that next coefficient group. Note that the process 450 also skips to operation 464 if the lower and right neighbor groups have significant-coefficient-flags that are both non-zero.

In operation 456, if there are non-zero coefficients in the current group, then the process 450 moves to operation 458 in which L1 RDOQ is performed with respect to the current group. That is the RD cost is calculated if the L1 flag (significant-coefficient-group flag) were set to zero, thereby resulting in all zero coefficients at the decoder. If the rate savings versus the distortion result in a lower RD cost, as evaluated in operation 460, then in operation 462 the coefficients are zeroed and the significant-coefficient-group flag is set to zero.

Example Syntax

An example syntax for implementing multi-level significance maps is provided below. This example syntax is but one possible implementation.

The significant-coefficient-group flags may be denoted and defined as:

significant_coeffgroup_flag[xCG][yCG]

This flag specifies, for the coefficient group position (xCG, yCG) within the current 16×16 or 32×32 transform block, whether the corresponding coefficient group at location (xCG, yCG) has non-zero coefficients as follows:

If significant_coeffgroup_flag[xCG][yCG] is equal to 0, the number of nonzero coefficients in the coefficient group at location (xCG, yCG) is set equal to 0;

Otherwise (significant_coeffgroup_flag[xCG][yCG] is equal to 1), the number of nonzero coefficients in the coefficient group at location (xCG, yCG) is non-zero except for the special cases defined below.

The special cases are defined as follows:
1. The significant_coeffgroup_flag[0][0] at the first coefficient group position (0, 0) in scan order is inferred to be equal to 1.
2. The significant_coeffgroup_flag[xCG][yCG] at the coefficient group position (xCG, yCG) in scan order is inferred to be equal to 1 if significant_coeffgroup_flag[xCG][yCG+1]=1 and significant_coeffgroup_flag[xCG+1][yCG]=1.

When significant_coeffgroup_flag[xCG][yCG] is not present, it is inferred to be equal to 0.

In some embodiments, the significant_coeffgroup_flag[xCG][yCG] does not apply to 4×4 and 8×8 transform blocks.

The following pseudo-code illustrates one example implementation of multi-level significance maps within the decoding process for reconstruction quantized transform domain coefficients (residuals).

It will be noted that the first portion of the pseudo-code includes decoding the last-significant coefficient position. The number of coefficient groups are then determined, if the transform unit is 16×16 or larger (as indicated by if (log 2TrafoSize>3)), and the number of coefficients in each coefficient group. The second if-else statement reflects the decoding of the significant-coefficient flags within the coefficient group containing the last-significant coefficient.

| residual_coding_cabac( x0, y0, log2TrafoSize, trafoDepth, scanIdx, cIdx ) { | Descriptor |
|---|---|
|   last_significant_coeff_x | ae(v) |
|   last_significant_coeff_y | ae(v) |
|   numCoeff = 0 | |
|   xC = ScanOrder[ log2TrafoSize − 2 ][ log2TrafoSize − 2 ][ scanIdx ][ numCoeff ][ 0 ] | |
|   yC = ScanOrder[ log2TrafoSize − 2 ][ log2TrafoSize − 2 ][ scanIdx ][ numCoeff ][ 1 ] | |
|   while( ( xC != last_significant_coeff_x ) \|\| ( yC != last_significant_coeff_y ) ) { | |
|     numCoeff++ | |
|     xC = ScanOrder[ log2TrafoSize − 2 ][ log2TrafoSize − 2 ][ scanIdx ][ numCoeff ][ 0 ] | |
|     yC = ScanOrder[ log2TrafoSize − 2 ][ log2TrafoSize − 2 ][ scanIdx ][ numCoeff ][ 1 ] | |
|   } | |
|   if (log2TrafoSize > 3) { | |
|     log2CoeffGroupSize = log2trafoSize−2 | |
|     numCoeffinCG = (1 << (log2CoeffGroupSize << 1)) | |
|     numCoeffGroup = ((numCoeff + numCoeffinCG −1)>> (log2CoeffGroupSize << 1)) | |
|     for( m = numCoeff − (numCoeffGroup−1)* numCoeffinCG−1; m >= 0; m−−) { | |
|       n = (numCoeffGroup−1)*numCoeffinCG + m | |
|       xC = ScanOrder[ log2TrafoSize − 2 ][ log2TrafoSize − 2 ][ scanIdx ][ n ][ 0 ] | |
|       yC = ScanOrder[ log2TrafoSize − 2 ][ log2TrafoSize − 2 ][ scanIdx ][ n ][ 1 ] | |
|       if (n == numCoeff−1) | |
|         significant_coeff_flag[ xC ][ yC ] = 1 | |

| residual_coding_cabac( x0, y0, log2TrafoSize, trafoDepth, scanIdx, cIdx ) { | Descriptor |
|---|---|
|     Else | |
|         significant_coeff_flag[ xC ][ yC ] | ae(v) |
|     } | |
|   for( nCG = numCoeffGroup−2; nCG >= 0; nCG−− ) { | |
|     xCG = ScanOrder[ 0 ][ 0 ][ scanIdx ][ nCG ][ 0 ] | |
|     yCG = ScanOrder[ 0 ][ 0 ][ scanIdx ][ nCG ][ 1 ] | |
|     rightCGFlag = (xCG == 4)? 0: significant_coeffgroup_flag[ xCG+1 ][ yCG ] | |
|     bottomCGFlag = (yCG == 4)? 0: significant_coeffgroup_flag[ xCG ][ yCG+1 ] | |
|     if ( ( rightCGFlag + bottomCGFlag == 2 ) || ( nCG == 0 ) ) | |
|     { | |
|       significant_coeffgroup_flag[ xCG ][ yCG ] = 1 | |
|     } else { | |
|       significant_coeffgroup_flag[ xCG ][ yCG ] | ae(v) |
|     } | |
|     if (significant_coeffgroup_flag[ xCG ][ yCG ] ) { | |
|       numNonzeroCoef = 0 | |
|       for( m = numCoeffGroup −1; m > 0; m−−) { | |
|         n = nCG*numCoeffinCG + m | |
|         xC = ScanOrder[ log2TrafoSize − 2 ][ log2TrafoSize − 2 ][ scanIdx ][ n ][ 0 ] | |
|         yC = ScanOrder[ log2TrafoSize − 2 ][ log2TrafoSize − 2 ][ scanIdx ][ n ][ 1 ] | |
|         significant_coeff_flag[ xC ][ yC ] | ae(v) |
|         numNonzeroCoef += significant_coeff_flag[ xC ][ yC ] | |
|       } | |
|       m = 0 | |
|       n = nCG*numCoeffinCG + m | |
|       xC = ScanOrder[ log2TrafoSize − 2 ][ log2TrafoSize − 2 ][ scanIdx ][ n ][ 0 ] | |
|       yC = ScanOrder[ log2TrafoSize − 2 ][ log2TrafoSize − 2 ][ scanIdx ][ n ][ 1 ] | |
|       if ( ( rightCGFlag + bottomCGFlag == 2 ) || ( nCG == 0 ) || numNonzeroCoef) { | |
|         significant_coeff_flag[ xC ][ yC ] | ae(v) |
|       } else { | |
|         significant_coeff_flag[ xC ][ yC ] = 1 | |
|       } | |
|     } else { | |
|       for( m = numCoeffGroup −1; m >= 0; m−−) { | |
|         n = nCG*numCoeffinCG + m | |
|         xC = ScanOrder[ log2TrafoSize − 2 ][ log2TrafoSize − 2 ][ scanIdx ][ n ][ 0 ] | |
|         yC = ScanOrder[ log2TrafoSize − 2 ][ log2TrafoSize − 2 ][ scanIdx ][ n ][ 1 ] | |
|         significant_coeff_flag[ xC ][ yC ] = 0 | |
|       } | |
|     } | |
|   } | |
|   } else | |
|   { | |
|     for( n = numCoeff − 1; n >= 0; n− − ) { | |
|       xC = ScanOrder[ log2TrafoSize − 2 ][ log2TrafoSize − 2 ][ scanIdx ][ n ][ 0 ] | |
|       yC = ScanOrder[ log2TrafoSize − 2 ][ log2TrafoSize − 2 ][ scanIdx ][ n ][ 1 ] | |
|       significant_coeff_flag[ xC ][ yC ] | ae(v) |
|     } | |
|   } | |
|   ....(decoding of coefficient values and signs omitted) | |
| } | |

The second for-loop within the main if-else statement reflects the group-by-group processing in group scan order. Within the first part of that loop, two special cases are dealt with in an if-else statement: the significant-coefficient-group flag is set to 1 if the coefficient-group is the upper left group (i.e. nCG=0) or if the groups to the right and bottom of the current group have significant-coefficient-group flags that are both non-zero. If those two cases do not apply (the "else" clause), then the significant-coefficient-group flag is decoded from the bitstream (significant_coeffgroup_flag [xCG][yCG]).

Following that if-else statement, a further if-else statement provides that if the significant-coefficient-group flag is non-zero, then the significant-coefficient flags for that group are decoded from the bitstream in scan order. All but the last (upper left) significant-coefficient flag in the group is decoded from the bitstream. The decoder then assesses whether any of the decoded significant-coefficient flags for that group are nonzero. If so, then it decodes the last (upper left) significant-coefficient flag for that group; and otherwise, it sets it to 1 because it knows that it cannot be zero.

The "else" statement that follows applies to the situation where the significant-coefficient-group flag is zero. In that case, all the significant-coefficient flags for that group are set to zero.

The foregoing pseudo-code shows one example implementation of the example method 700 described above in connection with FIG. 16. The significant-coefficient-group flags and their corresponding significant-coefficient flags (if any) are interleaved in this embodiment. A distinction between the example method 700 in FIG. 16 and the example pseudocode is that the example method 700 deals with the special case of the upper left group in operation 720, whereas the psuedocode deals with that special case within operation 708 by setting the significant-coefficient-group flag for that group to be non-zero and thus decoding that group's significant-coefficient flags from the bitstream in operation 714.

In another embodiment, the coefficient group size may be fixed. Example syntax using fixed 4×4 coefficient groups is set out in the following pseudocode:

| residual_coding_cabac( x0, y0, log2TrafoSize, trafoDepth, scanIdx, cIdx ) { | Descriptor |
|---|---|
|   last_significant_coeff_x | ae(v) |
|   last_significant_coeff_y | ae(v) |
|   numCoeff = 0 | |
|   xC = ScanOrder[ log2TrafoSize − 2 ][ log2TrafoSize − 2 ][ scanIdx ][ numCoeff ][ 0 ] | |
|   yC = ScanOrder[ log2TrafoSize − 2 ][ log2TrafoSize − 2 ][ scanIdx ][ numCoeff ][ 1 ] | |
|   while( ( xC != last_significant_coeff_x ) || ( yC != last_significant_coeff_y ) ) { | |
|     numCoeff++ | |
|     xC = ScanOrder[ log2TrafoSize − 2 ][ log2TrafoSize − 2 ][ scanIdx ][ numCoeff ][ 0 ] | |
|     yC = ScanOrder[ log2TrafoSize − 2 ][ log2TrafoSize − 2 ][ scanIdx ][ numCoeff ][ 1 ] | |
|   } | |
|   if (log2TrafoSize > 3) { | |
|     log2CoeffGroupSize = 2 | |
|     numCoeffinCG = (1 << (log2CoeffGroupSize << 1)) | |
|     numCoeffGroup = ((numCoeff + numCoeffinCG −1)>> (log2CoeffGroupSize << 1)) | |
|     for( m = numCoeff − (numCoeffGroup−1)* numCoeffinCG−1; m >= 0; m−−) { | |
|       n = (numCoeffGroup−1)*numCoeffinCG + m | |
|       xC = ScanOrder[ log2TrafoSize − 2 ][ log2TrafoSize − 2 ][ scanIdx ][ n ][ 0 ] | |
|       yC = ScanOrder[ log2TrafoSize − 2 ][ log2TrafoSize − 2 ][ scanIdx ][ n ][ 1 ] | |
|       if (n == numCoeff−1) | |
|         significant_coeff_flag[ xC ][ yC ] = 1 | |
|       Else | |
|         significant_coeff_flag[ xC ][ yC ] | ae(v) |
|     } | |
|     for( nCG = numCoeffGroup−2; nCG >= 0; nCG−− ) { | |
|       xCG = ScanOrder[ log2trafoSize − log2CoeffGroupSize −2 ][ log2trafoSize − log2CoeffGroupSize −2 ][ scanIdx ][ nCG ][ 0] | |
|       yCG = ScanOrder[ log2trafoSize − log2CoeffGroupSize −2 ][ log2trafoSize − log2CoeffGroupSize − 2 ][ scanIdx ][ nCG ][ 1] | |
|       rightCGFlag = (xCG == (1<< (log2trafoSize − log2CoeffGroupSize) ) )? 0: significant_coeffgroup_flag[ xCG+1 ][ yCG ] | |
|       bottomCGFlag = (yCG == (1 << (log2trafoSize − log2CoeffGroupSize) ) )? 0: significant_coeffgroup_flag[ xCG ] [ yCG+1 ] | |
|       if ( ( rightCGFlag + bottomCGFlag == 2 ) || ( nCG == 0 ) ) | |
|       { | |
|         significant_coeffgroup_flag[ xCG ][ yCG ] = 1 | |
|       } else { | |
|         significant_coeffgroup_flag[ xCG ][ yCG ] | ae(v) |
|       } | |
|       if (significant_coeffgroup_flag[ xCG ][ yCG ] ) { | |
|         numNonzeroCoef = 0 | |
|         for( m = numCoeffGroup −1; m > 0; m−−) { | |
|          n = nCG*numCoeffinCG + m | |
|          xC = ScanOrder[ log2TrafoSize − 2 ][ log2TrafoSize − 2 ][ scanIdx ][ n ][ 0 ] | |
|          yC = ScanOrder[ log2TrafoSize − 2 ][ log2TrafoSize − 2 ][ scanIdx ][ n ][ 1 ] | |
|          significant_coeff_flag[ xC ][ yC ] | ae(v) |
|          numNonzeroCoef += significant_coeff_flag[ xC ][ yC ] | |
|         } | |
|         m = 0 | |
|         n = nCG*numCoeffinCG + m | |
|         xC = ScanOrder[ log2TrafoSize − 2 ][ log2TrafoSize − 2 ][ scanIdx ][ n ][ 0 ] | |
|         yC = ScanOrder[ log2TrafoSize − 2 ][ log2TrafoSize − 2 ][ scanIdx ][ n ][ 1 ] | |
|         if ( ( rightCGFlag + bottomCGFlag == 2 ) || ( nCG == 0 ) || numNonzeroCoef) { | |
|          significant_coeff_flag[ xC ][ yC ] | ae(v) |
|         } else { | |
|          significant_coeff_flag[ xC ][ yC ] = 1 | |
|         } | |
|       } else { | |
|         for( m = numCoeffGroup −1; m >= 0; m−−) { | |
|          n = nCG*numCoeffinCG + m | |
|          xC = ScanOrder[ log2TrafoSize − 2 ][ log2TrafoSize − 2 ][ scanIdx ][ n ][ 0 ] | |
|          yC = ScanOrder[ log2TrafoSize − 2 ][ log2TrafoSize − 2 ][ scanIdx ][ n ][ 1 ] | |
|          significant_coeff_flag[ xC ][ yC ] = 0 | |
|         } | |
|       } | |
|     } | |
|   } else | |
|   { | |
|     for( n = numCoeff − 1; n >= 0; n−− ) { | |
|       xC = ScanOrder[ log2TrafoSize − 2 ][ log2TrafoSize − 2 ][ scanIdx ][ n ][ 0 ] | |
|       yC = ScanOrder[ log2TrafoSize − 2 ][ log2TrafoSize − 2 ][ scanIdx ][ n ][ 1 ] | |
|       significant_coeff_flag[ xC ][ yC ] | ae(v) |
|     } | |
|   } | |
|   ....(decoding of coefficient values and signs omitted) | |
| } | |

In yet another embodiment, the significant-coefficient-group flags may not be interleaved with the significant-coefficient flags within the bitstream. That is, the significant-coefficient-group flags are encoded in the bitstream together and the significant-coefficient flags, group-by-group in the scan order, follow them in the bitstream. Example syntax corresponding to a non-interleaved embodiment is set out in the following pseudocode:

| residual_coding_cabac( x0, y0, log2TrafoSize, trafoDepth, scanIdx, cIdx ) { | Descriptor |
|---|---|
|   last_significant_coeff_x | ae(v) |
|   last_significant_coeff_y | ae(v) |
|   numCoeff = 0 | |
|   xC = ScanOrder[ log2TrafoSize − 2 ][ log2TrafoSize − 2 ][ scanIdx ][ numCoeff ][ 0 ] | |
|   yC = ScanOrder[ log2TrafoSize − 2 ][ log2TrafoSize − 2 ][ scanIdx ][ numCoeff ][ 1 ] | |
|   while( ( xC != last_significant_coeff_x ) || ( yC != last_significant_coeff_y ) ) { | |
|     numCoeff++ | |
|     xC = ScanOrder[ log2TrafoSize − 2 ][ log2TrafoSize − 2 ][ scanIdx ][ numCoeff ][ 0 ] | |
|     yC = ScanOrder[ log2TrafoSize − 2 ][ log2TrafoSize − 2 ][ scanIdx ][ numCoeff ][ 1 ] | |
|   } | |
|   if (log2TrafoSize > 3) { | |
|     log2CoeffGroupSize = log2trafoSize−2 | |
|     numCoeffinCG = (1 << (log2CoeffGroupSize << 1)) | |
|     numCoeffGroup = ((numCoeff + numCoeffinCG −1)>> (log2CoeffGroupSize << 1)) | |
|     nCG = numCoeffGroup-1 | |
|     xCG = ScanOrder[ 0 ][ 0 ][ scanIdx ][ nCG ][ 0] | |
|     yCG = ScanOrder[ 0 ][ 0 ][ scanIdx ][ nCG ][ 1] | |
|     significant_coeffgroup_flag[ xCG ][ yCG ] = 1 | |
|     nCG = 0 | |
|     xCG = ScanOrder[ 0 ][ 0 ][ scanIdx ][ nCG ][ 0] | |
|     yCG = ScanOrder[ 0 ][ 0 ][ scanIdx ][ nCG ][ 1] | |
|     significant_coeffgroup_flag[ xCG ][ yCG ] = 1 | |
|     for( nCG = numCoeffGroup-2; nCG > 0; nCG-- ) { | |
|       xCG = ScanOrder[ 0 ][ 0 ][ scanIdx ][ nCG ][ 0] | |
|       yCG = ScanOrder[ 0 ][ 0 ][ scanIdx ][ nCG ][ 1] | |
|       rightCGFlag = (xCG == 4)? 0: significant_coeffgroup_flag[ xCG+1 ][ yCG ] | |
|       bottomCGFlag = (yCG == 4)? 0: significant_coeffgroup_flag[ xCG ] [ yCG+1 ] | |
|       if ( rightCGFlag + bottomCGFlag == 2 ) | |
|       { | |
|         significant_coeffgroup_flag[ xCG ][ yCG ] = 1 | |
|       } else { | |
|         significant_coeffgroup_flag[ xCG ][ yCG ] | ae(v) |
|       } | |
|     } | |
|     nCG = numCoeffGroup-1 | |
|     for( m = numCoeff − nCG*numCoeffinCG-1; m >= 0; m--) { | |
|       n = nCG*numCoeffinCG + m | |
|       xC = ScanOrder[ log2TrafoSize − 2 ][ log2TrafoSize − 2 ][ scanIdx ][ n ][ 0 ] | |
|       yC = ScanOrder[ log2TrafoSize − 2 ][ log2TrafoSize − 2 ][ scanIdx ][ n ][ 1 ] | |
|       if (n == numCoeff−1) | |
|         significant_coeff_flag[ xC ][ yC ] = 1 | |
|       Else | |
|         significant_coeff_flag[ xC ][ yC ] | ae(v) |
|     } | |
|     for( nCG = numCoeffGroup-2; nCG >= 0; nCG-- ) { | |
|       if (significant_coeffgroup_flag[ xCG ][ yCG ] ) { | |
|         numNonzeroCoef = 0 | |
|         for( m = numCoeffGroup −1; m > 0; m--) { | |
|           n = nCG*numCoeffinCG + m | |
|           xC = ScanOrder[ log2TrafoSize − 2 ][ log2TrafoSize − 2 ][ scanIdx ][ n ][ 0 ] | |
|           yC = ScanOrder[ log2TrafoSize − 2 ][ log2TrafoSize − 2 ][ scanIdx ][ n ][ 1 ] | |
|           significant_coeff_flag[ xC ][ yC ] | ae(v) |
|           numNonzeroCoef += significant_coeff_flag[ xC ][ yC ] | |
|         } | |
|         m = 0 | |
|         n = nCG*numCoeffinCG + m | |
|         xC = ScanOrder[ log2TrafoSize − 2 ][ log2TrafoSize − 2 ][ scanIdx ][ n ][ 0 ] | |
|         yC = ScanOrder[ log2TrafoSize − 2 ][ log2TrafoSize − 2 ][ scanIdx ][ n ][ 1 ] | |
|         xCG = ScanOrder[ 0 ][ 0 ][ scanIdx ][ nCG ][ 0] | |
|         yCG = ScanOrder[ 0 ][ 0 ][ scanIdx ][ nCG ][ 1] | |
|         rightCGFlag = (xCG == 4)? 0: significant_coeffgroup_flag[ xCG+1 ][ yCG ] | |
|         bottomCGFlag = (yCG == 4)? 0: significant_coeffgroup_flag[ xCG ] [ yCG+1 ] | |
|         if ( ( rightCGFlag + bottomCGFlag == 2 ) || ( nCG == 0 ) || numNonzeroCoef) { | |
|           significant_coeff_flag[ xC ][ yC ] | ae(v) |
|         } else { | |
|           significant_coeff_flag[ xC ][ yC ] = 1 | |
|         } | |

| residual_coding_cabac( x0, y0, log2TrafoSize, trafoDepth, scanIdx, cIdx ) { | Descriptor |
|---|---|
|     } else {<br>       for( m = numCoeffGroup −1; m >= 0; m−−) {<br>          n = nCG*numCoeffinCG + m<br>          xC = ScanOrder[ log2TrafoSize − 2 ][ log2TrafoSize − 2 ][ scanIdx ][ n ][ 0 ]<br>          yC = ScanOrder[ log2TrafoSize − 2 ][ log2TrafoSize − 2 ][ scanIdx ][ n ][ 1 ]<br>          significant_coeff_flag[ xC ][ yC ] = 0<br>       }<br>      }<br>    }<br>  } else<br>  {<br>    for( n = numCoeff − 1; n >= 0; n−− ) {<br>      xC = ScanOrder[ log2TrafoSize − 2 ][ log2TrafoSize − 2 ][ scanIdx ][ n ][ 0 ]<br>      yC = ScanOrder[ log2TrafoSize − 2 ][ log2TrafoSize − 2 ][ scanIdx ][ n ][ 1 ]<br>      significant_coeff_flag[ xC ][ yC ]<br>    }<br>  }<br>...(decoding of coefficient values and signs omitted)<br>} | <br><br><br><br><br><br><br><br><br><br><br><br><br><br>ae(v) |

Figure 12:
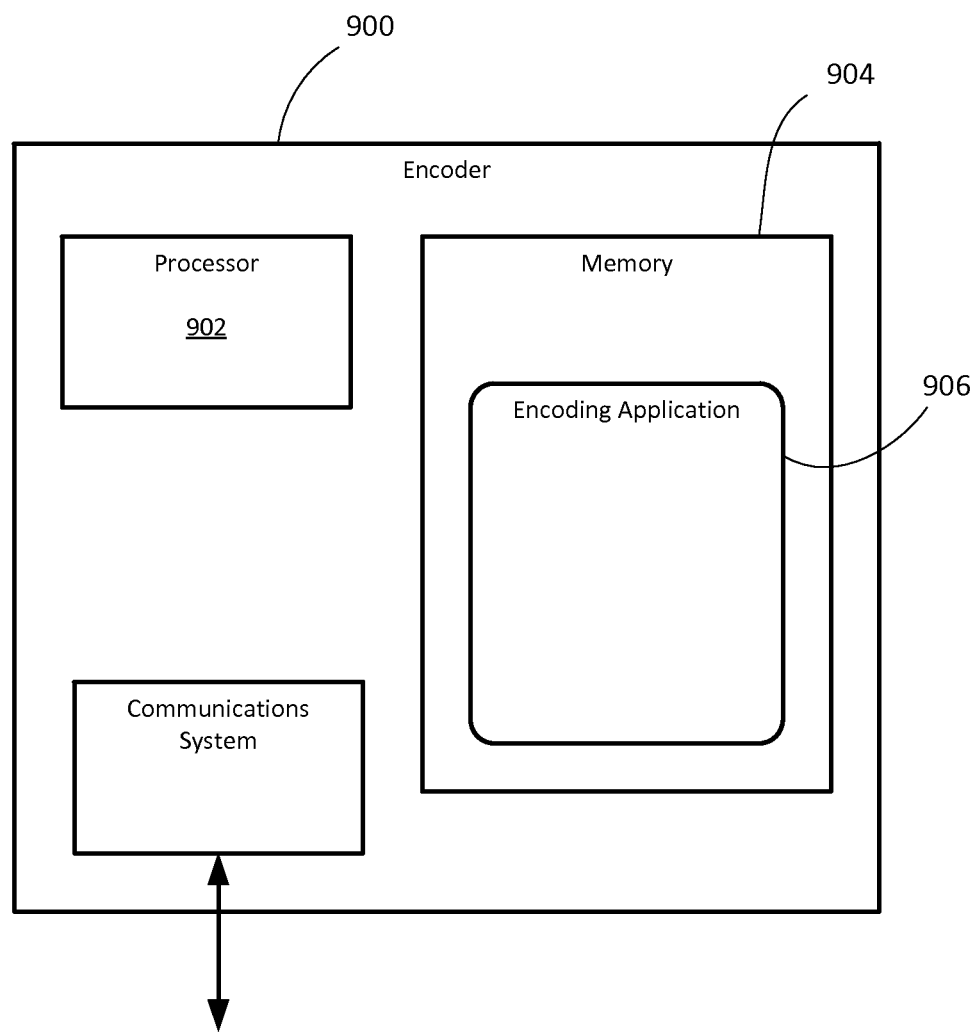
FIG. 12 shows a simplified block diagram of an example embodiment of an encoder.

Reference is now made to FIG. 12, which shows a simplified block diagram of an example embodiment of an encoder 900. The encoder 900 includes a processor 902, memory 904, and an encoding application 906. The encoding application 906 may include a computer program or application stored in memory 904 and containing instructions for configuring the processor 902 to perform operations such as those described herein. For example, the encoding application 906 may encode and output bitstreams encoded in accordance with the multi-level significance map processes described herein. It will be understood that the encoding application 906 may be stored in on a computer readable medium, such as a compact disc, flash memory device, random access memory, hard drive, etc.

Figure 13:
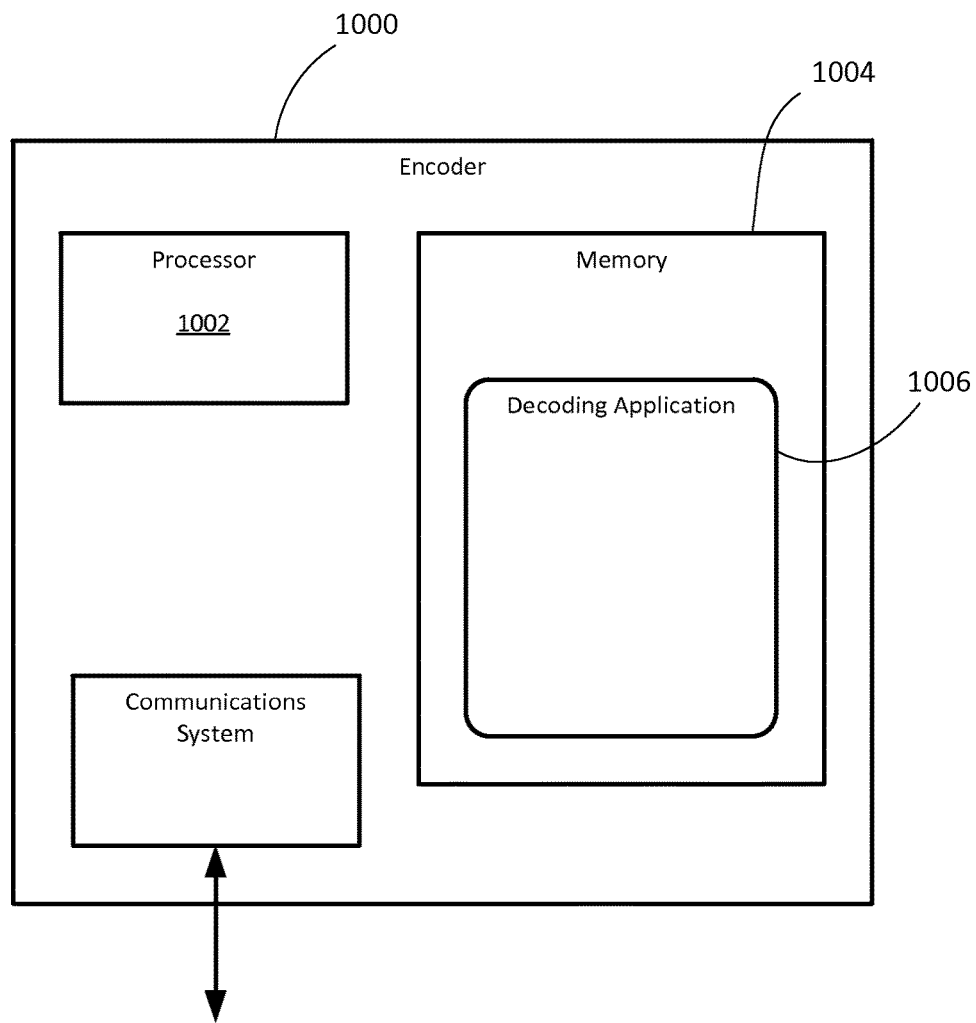
FIG. 13 shows a simplified block diagram of an example embodiment of a decoder.

Reference is now also made to FIG. 13, which shows a simplified block diagram of an example embodiment of a decoder 1000. The decoder 1000 includes a processor 1002, a memory 1004, and a decoding application 1006. The decoding application 1006 may include a computer program or application stored in memory 1004 and containing instructions for configuring the processor 1002 to perform operations such as those described herein. The decoding application 1006 may include an entropy decoder configured to reconstruct residuals based on multi-level significance maps, as described herein. It will be understood that the decoding application 1006 may be stored in on a computer readable medium, such as a compact disc, flash memory device, random access memory, hard drive, etc.

It will be appreciated that the decoder and/or encoder according to the present application may be implemented in a number of computing devices, including, without limitation, servers, suitably programmed general purpose computers, audio/video encoding and playback devices, set-top television boxes, television broadcast equipment, and mobile devices. The decoder or encoder may be implemented by way of software containing instructions for configuring a processor to carry out the functions described herein. The software instructions may be stored on any suitable non-transitory computer-readable memory, including CDs, RAM, ROM, Flash memory, etc.

It will be understood that the encoder described herein and the module, routine, process, thread, or other software component implementing the described method/process for configuring the encoder may be realized using standard computer programming techniques and languages. The present application is not limited to particular processors, computer languages, computer programming conventions, data structures, other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A method of reconstructing significant-coefficient flags for a transform unit from a bitstream of encoded data, wherein the transform unit is partitioned into non-overlapping blocks, each block containing a respective group of significant-coefficient flags, and the bitstream including encoded significant-coefficient-group flags, wherein each significant-coefficient-group flag corresponds to a respective block and its group of significant-coefficient flags, the method comprising:

for each of the respective groups of significant-coefficient flags, in a group scan order within the transform unit, wherein the group scan order is horizontal, vertical or diagonal,
reconstructing that group's corresponding significant-coefficient-group flag, and
reconstructing the significant-coefficient flags in that group in a scan order within the group, wherein the scan order is horizontal, vertical or diagonal, by, for each significant-coefficient flag in that group,
if that significant-coefficient flag is at position (0,0) in its group, the corresponding significant-coefficient-group flag is decoded to be non-zero, and all of the previous significant-coefficient flags in that group are zero, then inferring, without decoding that significant-coefficient flag from the bitstream, that significant-coefficient flag to be 1, and
otherwise
decoding that significant-coefficient flag from the bitstream if that significant-coefficient flag is in a group that has corresponding significant-coefficient-group flag that is non-zero, and setting that significant-coefficient flag to zero, if that significant-coefficient flag is in a group that has corresponding significant-coefficient-group flag that is zero.

2. The method claimed in claim 1, wherein the group scan order is a prescribed order in which the respective groups of significant-coefficient flags are to be reconstructed.

3. The method claimed in claim 2, wherein the significant-coefficient flags of a next one of the respective groups are reconstructed only after all significant-coefficient flags of all groups earlier in the group scan order are reconstructed.

4. The method claimed in claim 1, wherein the significant-coefficient flags of a next one of the respective groups are reconstructed only after all significant-coefficient flags of all groups earlier in the group scan order are reconstructed.

5. The method claimed in claim 1, wherein reconstructing the significant-coefficient-group flags includes decoding at least some of the significant-coefficient-group flags from the encoded data of the bitstream.

6. The method claimed in claim 1, wherein reconstructing that group's corresponding significant-coefficient-group flag comprises inferring, without decoding that significant-coefficient-group flag from the bitstream, that group's significant-coefficient-group flag to be 1 if that group contains the significant-coefficient flag for a last-significant coefficient.

7. The method claimed in claim 1, wherein reconstructing that group's corresponding significant-coefficient-group flag comprises inferring, without decoding that significant-coefficient-group flag from the bitstream, that group's significant-coefficient-group flag to be 1 if that group contains the significant-coefficient flag for a coefficient at position [0,0] within the transform unit.

8. The method claimed in claim 1, wherein the groups are contiguous square blocks.

9. The method claimed in claim 1, wherein each group is a non-square rectangular block.

10. The method claimed in claim 1, wherein reconstructing one of the significant-coefficient-group flags includes determining a context for that significant-coefficient-group flag based on the significant-coefficient-group flags reconstructed for two neighbor groups.

11. The method claimed in claim 10, wherein the two neighbor groups include a right neighbor and a below neighbor, and wherein the context is 0 if both of the significant-coefficient-flags for the two neighbor groups are 0, and wherein otherwise the context is 1.

12. The method of claim 1, wherein the group scan order and the scan order within the group are the same.

13. A decoder for decoding a bitstream of encoded data to reconstruct significant-coefficient flags for a transform unit, wherein the transform unit is partitioned into non-overlapping blocks, each block containing a respective group of significant-coefficient flags, and the bitstream including encoded significant-coefficient-group flags, wherein each significant-coefficient-group flag corresponds to a respective block and its group of significant-coefficient flags, the decoder comprising:
 a processor;
 a memory; and
 a decoding application stored in memory and containing instructions for configuring the processor to:
  for each of the respective groups of significant-coefficient flags, in a group scan order within the transform unit, wherein the group scan order is horizontal, diagonal or vertical,
   reconstruct that group's corresponding significant-coefficient-group flag, and
   reconstruct the significant-coefficient flags in that group in a scan order within the group, wherein the scan order is horizontal, diagonal or vertical, by, for each significant-coefficient flag in that group,
    if that significant-coefficient flag is at position (0,0) in its group, a corresponding significant-coefficient-group flag is decoded to be non-zero, and all of the previous significant-coefficient flags in that group are zero, then inferring, without decoding that significant-coefficient flag from the bitstream, that significant-coefficient flag to be 1, and
    otherwise
     decoding that significant-coefficient flag from the bitstream if that significant-coefficient flag is in a group that has corresponding significant-coefficient-group flag that is non-zero, and
     setting that significant-coefficient flag to zero, if that significant-coefficient flag is in a group that has corresponding significant-coefficient-group flag that is zero.

14. The decoder claimed in claim 13, wherein the group scan order is a prescribed order in which the respective groups of significant-coefficient flags are to be reconstructed.

15. The decoder claimed in claim 14, wherein the significant-coefficient flags of a next one of the respective groups are reconstructed only after all significant-coefficient flags of all groups earlier in the group scan order are reconstructed.

16. The decoder claimed in claim 13, wherein the significant-coefficient flags of a next one of the respective groups are reconstructed only after all significant-coefficient flags of all groups earlier in the group scan order are reconstructed.

17. The decoder claimed in claim 13, wherein the processor is configured to reconstruct the significant-coefficient-group flags by decoding at least some of the significant-coefficient-group flags from the encoded data of the bitstream.

18. The decoder claimed in claim 13, wherein the processor is further configured to set a significant-coefficient-group flag to 1 for a group containing the significant-coefficient flag for a last-significant coefficient.

19. The decoder claimed in claim 13, wherein the processor is further configured to set a significant-coefficient-group flag to 1 for a group containing the significant-coefficient flag for a coefficient at position [0,0] within the transform unit.

20. The decoder claimed in claim 13, wherein the groups are contiguous square blocks.

21. The decoder claimed in claim 13, wherein each group is a non-square rectangular block.

22. The decoder claimed in claim 13, wherein the processor is configured to reconstruct one of the significant-coefficient-group flags by determining a context for that significant-coefficient-group flag based on the significant-coefficient-group flags reconstructed for two neighbor groups.

23. The decoder claimed in claim 22, wherein the two neighbor groups include a right neighbor and a below neighbor, and wherein the context is 0 if both of the significant-coefficient-flags for the two neighbor groups are 0, and wherein otherwise the context is 1.

24. The decoder of claim 13, wherein the group scan order and the scan order within the group are the same.

25. A non-transitory processor-readable medium storing processor-executable instructions which, when executed, configures one or more processors to perform the method claimed in claim 1.

26. A method for encoding significant-coefficient flags for a transform unit, wherein the transform unit is partitioned into non-overlapping blocks, each block containing a respective group of significant-coefficient flags and having a corresponding significant-coefficient group flag, the method comprising:

for each respective group of significant-coefficient flags in a group scan order within the transform unit, wherein the group scan order is horizontal, diagonal or vertical, determining that group's corresponding significant-coefficient-group flag, wherein that group's corresponding significant-coefficient-group flag is set to zero if that group contains no non-zero significant-coefficient flags, but setting the significant-coefficient group flag to one for a group containing a significant-coefficient flag at position [0,0] in the transform unit irrespective of whether that group has any non-zero significant-coefficient flags, and encoding the significant-coefficient flags in that group in a scan order within the group, wherein the scan order within the group is horizontal, diagonal or vertical, if that group's corresponding significant-coefficient-group flag is non-zero, except the significant-coefficient-flag at position (0,0) in that group when both of the following conditions are met:

all the previous significant-coefficient flags in that group are zero, and the significant-coefficient flag is not at position [0,0] in the transform unit.

27. The method of claim 26, wherein the group scan order and the scan order within the group are the same.

28. An encoder for encoding significant-coefficient flags for a transform unit, the encoder comprising:

a processor;

a memory storing a significance map; and an encoding application stored in memory and containing instructions for configuring the processor to perform the method claimed in claim 26.

29. A non-transitory processor-readable medium storing processor-executable instructions which, when executed, configures one or more processors to perform the method claimed in claim 26.

* * * * *